United States Patent
Aijaz et al.

(10) Patent No.: US 11,172,498 B2
(45) Date of Patent: Nov. 9, 2021

(54) METHOD OF GENERATING A COMMUNICATION SCHEDULE FOR NODES IN A MULTI-HOP NETWORK

(71) Applicant: Kabushiki Kaisha Toshiba, Minato-ku (JP)

(72) Inventors: Adnan Aijaz, Bristol (GB); Aleksandar Stanoev, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/574,969

(22) Filed: Sep. 18, 2019

(65) Prior Publication Data

US 2021/0084675 A1    Mar. 18, 2021

(51) Int. Cl.
*H04W 72/12* (2009.01)
*H04W 72/04* (2009.01)
(Continued)

(52) U.S. Cl.
CPC ..... *H04W 72/1273* (2013.01); *H04W 72/044* (2013.01); *H04J 3/1694* (2013.01); *H04W 84/18* (2013.01)

(58) Field of Classification Search
CPC ......... H04W 72/1273; H04W 72/1268; H04W 72/044; H04W 72/0446; H04W 84/18;
(Continued)

(56) References Cited

U.S. PATENT DOCUMENTS 6,788,702 B1 * 9/2004 Garcia-Luna-Aceves ...................
H04L 45/02
370/337
2007/0133592 A1 * 6/2007 Zheng .................. H04W 74/04
370/458

(Continued)

OTHER PUBLICATIONS

Aijaz et al., "DeAMON: A Decentralized Adaptive Multi-Hop Scheduling Protocol for 6TiSCH Wireless Networks," IEEE Sensors Journal., vol. 17, No. 20, Oct. 15, 2017, pp. 6825-6836 (Year: 2017).*

(Continued)

*Primary Examiner* — Un C Cho
*Assistant Examiner* — Lalita W Pace
(74) *Attorney, Agent, or Firm* — Oblon, McClelland, Maier & Neustadt, L.L.P.

(57) ABSTRACT

A method of generating a communication schedule for a plurality of nodes in a multi-hop network, the plurality of nodes comprising a first node, a second node and a third node, wherein: the second node is a primary parent of the first node and the third node is a secondary parent of the first node. The method comprises requesting, by the first node, a first resource in the communication schedule for communication from the first node to the second node and a second resource in the communication schedule for communication from the first node to the third node. The method further comprises allocating, by at least one of the second or third node, a second set of resources in the communication schedule comprising a third resource in the communication (Continued)

schedule for communication from the first node to the second node and a fourth resource in the communication schedule for communication from the first node to the third node; wherein: at least the third resource does not generate a conflict in the communication schedule.

8 Claims, 15 Drawing Sheets

(51) Int. Cl.
*H04J 3/16* (2006.01)
*H04W 84/18* (2009.01)

(58) Field of Classification Search
CPC ... H04W 72/0453; H04J 3/1694; H04L 45/04; H04L 45/24
See application file for complete search history.

(56) References Cited

U.S. PATENT DOCUMENTS

| | | | |
|---|---|---|---|
| 2008/0298390 A1* | 12/2008 | Kneckt | H04L 47/70 370/468 |
| 2013/0271072 A1 | 10/2013 | Lee et al. | |
| 2015/0049644 A1* | 2/2015 | Lee | H04W 84/20 370/256 |
| 2016/0021596 A1* | 1/2016 | Hui | H04W 40/04 370/329 |
| 2017/0013614 A1* | 1/2017 | Chandrashekar | H04R 27/00 |
| 2018/0302908 A1 | 10/2018 | Aijaz | |
| 2019/0104519 A1* | 4/2019 | Sydir | H04L 41/12 |
| 2019/0159201 A1* | 5/2019 | Jin | H04L 5/0032 |

OTHER PUBLICATIONS

Kiryanov et al., "Analysis of algorithms for decentralized dynamic channel resource reservation for data streaming in Wi-Fi networks," Journal of Communications Technology & Electronics, pp. 694-703, Springer Nature B.V. (Jun. 2017) (Year: 2017).*
Mesh Working Group, Bluetooth SIG, Mesh Profile, Version 1.0, Jul. 13, 2017, 331 pages.

* cited by examiner

METHOD OF GENERATING A COMMUNICATION SCHEDULE FOR NODES IN A MULTI-HOP NETWORK

FIELD

Embodiments described herein relate generally to a method of generating a communication schedule for a plurality of nodes in a multi-hop network, and in particular to the use of said method in a Wireless Battery Area Network.

BACKGROUND

Large-scale battery systems are increasingly being used in various industrial and automotive applications. Modern-day battery systems often include a battery management system for improving performance, extending battery life and ensuring user safety. Typically, a battery management system comprises a Battery Management Unit (BMU) and a plurality of Cell Monitoring Units (CMU). The Battery Management Unit (BMU) is responsible for managing the overall battery system while the Cell Monitoring Units (CMU) are mounted to individual battery cells and are configured to provide diagnostic information to the Battery Management Unit (BMU).

Wired connections are typically used throughout the battery system to connect the Cell Monitoring Units (CMUs) to the Battery Management Unit (BMU). However, connecting Cell Monitoring Units (CMUs) to the Battery Management Unit (BMU) in this way becomes increasingly unsustainable as the number of cells increases due to the physical constraints of the battery system and the susceptibility of the physical connections to failure in the presence of vibrations.

Wireless Battery Area Networks (WiBaAN) are seen as a cost-effective alternative to the use of wired networks since they enable monitoring and control of individual batteries without many of the drawbacks discussed above.

Communication links in Wireless Battery Area Networks (WiBaAN) are normally bi-directional, enabling sensor information (e.g. voltage, temperature, etc.) to be communicated from the Cell Monitoring Units (CMU) to the Battery Management Unit (BMU) and configuration information to be communicated from the Battery Management Unit (BMU) to the Cell Monitoring Units (CMU).

In addition to being bi-directional it is generally desirable for the communication links to have cyclic information exchanges and deterministic latency guarantees. Cyclic information exchanges increase the reliability of the communication link by reducing the risk of collisions while also reducing the power consumption of each Cell Monitoring Unit (CMUs).

One way of realising a communication schedule with a deterministic latency and a high efficiency is to schedule communications using Time Division Multiple Access (TDMA). Time Division Multiple Access (TDMA) enables the nodes in the network (i.e. the Battery Management Unit (BMU) and the Cell Monitoring Units (CMU)) to only activate their communications equipment during designated time slots.

Constructing a Time Division Multiple Access (TDMA) schedule in a distributed manner is necessary for any self-configuring Wireless Battery Area Network (WiBaAN). However, this is not straight-forward, especially in multi-hop topologies (i.e. where an intermediary device is required to relay a message to and/or from the Battery Management Unit (BMU)). In light of this a new approach for generating a Time Division Multiple Access (TDMA) communication schedule is required for multi-hop networks.

Arrangements of the present invention will be understood and appreciated more fully from the following detailed description, made by way of example only and taken in conjunction with drawings in which.

DETAILED DESCRIPTION

Figure 1:
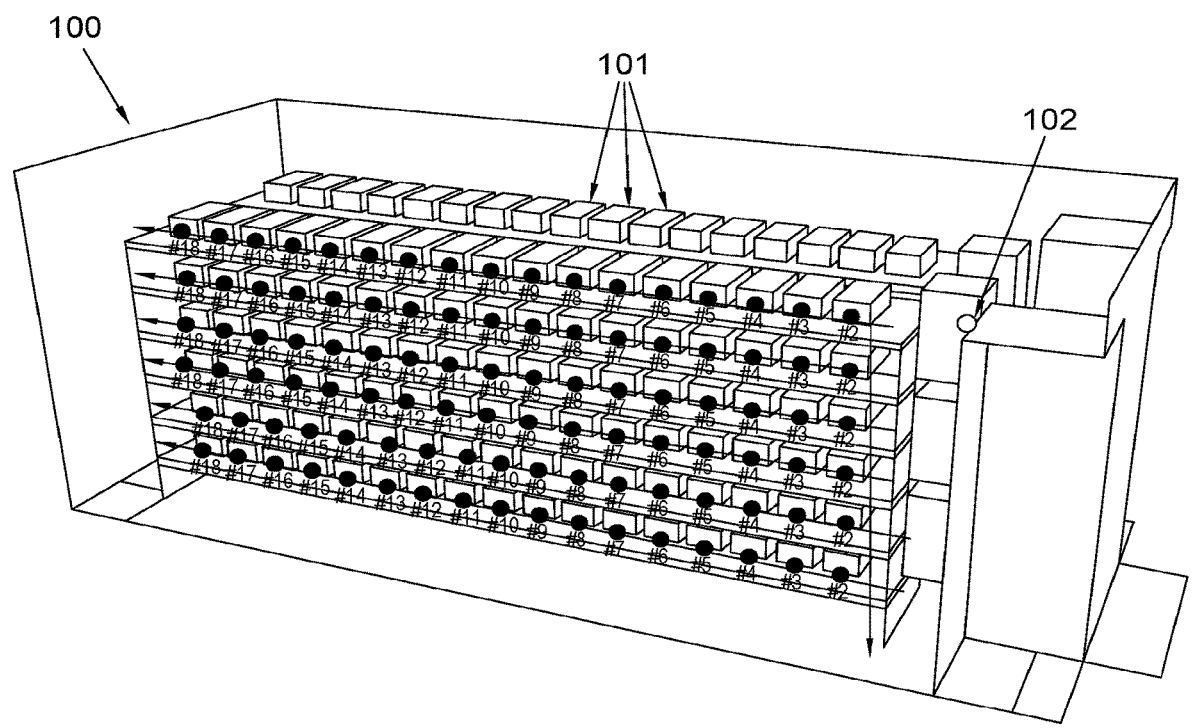
FIG. 1 shows an illustration of a Wireless Battery Area Network (WiBaAN)

According to a first aspect of the invention there is provided a method of generating a communication schedule for a plurality of nodes in a multi-hop network. The plurality of nodes comprising a first node, a second node and a third node, wherein: the second node is a primary parent of the first node and the third node is a secondary parent of the first node. The method comprising requesting, by the first node; a first resource in the communication schedule for communication from the first node to the second node; and a second resource in the communication schedule for communication from the first node to the third node. The method further comprising allocating, by at least one of the second or third node, a second set of resources in the communication schedule comprising: a third resource in the communication schedule for communication from the first node to the second node; and a fourth resource in the communication schedule for communication from the first node to the third node; wherein: at least the third resource does not generate a conflict in the communication schedule.

In the above method a parent node is a node in a network of nodes to which uplink communications are sent, and from which downlink communications are received, a primary parent is a first parent node of a plurality of parent nodes and a secondary parent is a second parent node of a plurality of parent nodes. In the above method a child node is a node in the network of nodes to which downlink communications are sent and from which uplink communications are received.

In an embodiment, the first node transmits the same message in the third resource and the fourth resource.

In the above method, a resource request does not generate a conflict in the communication schedule if the resulting communication schedule contains only one transmission during the a timeslot, on a frequency channel, in a communicative range of a receiver node (e.g. the second or third node). In contrast, a resource request does generate a conflict in the communication schedule if transmitting on the resource in the communication schedule would result in at least two transmissions occurring at the same time, on the same frequency channel within communicative range of a node (e.g. the second or third node).

In an embodiment, a resource is a timeslot on a frequency channel and the method further comprises: determining, by at least one of the second or the third node, whether the first resource or the second resource generates a conflict in the communication schedule; and if not; assigning the third resource equal to the first resource; and assigning the fourth resource equal to the second resource.

In an embodiment, the second node determines whether the first resource and the second resource generate a conflict in the communication schedule.

In an embodiment, the method further comprises: receiving by the first node, a downlink signalling message (DLS) comprising a relative transmission priority for each node that uses the second node as a primary parent; and requesting, by the first node, the first resource and the second resource on a scheduling channel based on the relative transmission priority of the first node in the downlink signalling message (DLS).

In an embodiment, the method the downlink signalling message (DLS) further comprises a relative transmission priority for each node that uses the second node as a secondary parent.

In an embodiment, the relative transmission priority for each node that uses the second node as a secondary parent is lower than the relative transmission priority for each node that uses the second node as a primary parent.

In an embodiment, the first node requests the first resource and the second resource by transmitting a multi-packet request for uplink slots message (MP-RFS-U); and the second set of resources is allocated by the second node.

In an embodiment the third node is a primary parent of a fourth node and the method further comprises: receiving, by the third node, from the fourth node, after receiving the request from the first node, a request for a fifth resource in the communication schedule; and transmitting, by the third node a multi-packet assignment message (MP-ASG) comprising: an indication of whether the second resource or the fifth resource generates a conflict in the communication schedule.

In an embodiment the second set of resources is allocated by the second node and the third node, and the method further comprises: requesting, by the first node, the first resource by transmitting a first Request-for-Slots (RFS) message to the second node; and requesting, by the first node, the second resource by transmitting a second Request-for-Slots (RFS) message to the third node.

In an embodiment a fifth node acts as the primary parent to the third node, and the method further comprises requesting, by the third node a plurality of resources in the communication schedule comprising: a sixth resource for transmitting data generated by the third node; and a number of resources equal to a number of nodes that associate the third node as a parent node.

In an embodiment the method further comprises: determining, by the first node, whether an assignment message (ASG) has been received after requesting at least one of the first resource or the second resource; and if not: requesting at least a seventh resource in the communication schedule, wherein the seventh resource is on a different frequency channel to the first or the second resource.

In an embodiment the method further comprises: requesting by the third node, a plurality of resources in the communication schedule comprising: an eighth resource for transmitting data generated by the third node; a resource for each node that associate the third node as a primary parent node; and at least one resource for transmitting a combined message, wherein the combined message is formed by combining data received from a node that associates the third node as a primary parent and data received from a node that associates the third node as a secondary parent.

Optionally, a combined message is generated by XORing the uplink data from the primary child with the uplink data from the secondary child.

In an embodiment each node in the plurality of nodes request a resource allocation in the uplink communication schedule for itself only once each of the nodes for which it acts as a primary parent and a secondary parent have been allocation resources in the uplink communication schedule.

According to a second aspect there is provided a multi-hop network comprising a first node, a second node and a third node, wherein: the second node is a primary parent of the first node and the third node is a secondary parent of the first node, and wherein in order to generate a communication schedule for the plurality of nodes the multi-hop network configured so that: the first node requests: a first resource in the communication schedule for communication from the first node to the second node; and a second resource in the communication schedule for communication from the first node to the third node; and at least one of the second or third node allocates a second set of resources in the communication schedule comprising: a third resource in the communication schedule for communication from the first node to the second node; and a fourth resource in the communication schedule for communication from the first node to the third node; wherein: at least the third resource does not generate a conflict in the communication schedule.

According to a third aspect there is provided a method of operating a network comprising a leak node and a plurality of nodes logically distributed between a first set of nodes and a second set of nodes. The method comprising: communicating by the first set of nodes with a first controller node on a first frequency; and communicating by the second set of nodes with a second controller node on a second frequency; wherein: the first frequency is different from the second frequency; and the first set of nodes and the second set of nodes communicate in parallel.

In an embodiment, communication comprises uplink and downlink communications. Optionally, the plurality of nodes are distributed substantially equally.

In an embodiment the first set of nodes and the second set of nodes generate a communication schedule according to GALLOP.

In an embodiment the first set of nodes and the second set of nodes generate a communication schedule according to the method described in the first aspect of the invention.

In an embodiment the first frequency and the second frequency are orthogonal.

In an embodiment, each node in the plurality of nodes is associated with the first set of nodes or the second set of nodes, a priori, before generating the communication schedule.

In an embodiment, the number of node, N, is distributed between the first node and the second node such that nodes 1 to n communicate with the first controller node whereas nodes n+1 to N communication with the second controller node, wherein n=N/2.

In an embodiment the first set of nodes communicate with the first controller node on the first frequency according to a first uplink and downlink schedule and the second set of nodes communicate with the second controller node on the second frequency according to a second uplink and downlink schedule. In this embodiment the method further comprises: the first set of nodes communicating with the second controller node on the second frequency according to a first redundant uplink and downlink schedule once the first uplink and downlink schedule is completed; and the second set of nodes communicating with the first controller node on the first frequency according to a second redundant uplink and downlink schedule once the second uplink and downlink schedule is completed.

In an embodiment, the data communicated by the plurality of nodes is the same during the first/second uplink and downlink schedule and the first/second redundant uplink and downlink schedule.

In an embodiment, a timeslot allocated to a node in the first/second redundant uplink and downlink schedule is determined by adjusting the timeslot allocated to the node in the first/second uplink and downlink schedule by a fixed offset.

Optionally, the fixed offset is applied to a position of the timeslot relative to a first timeslot in the communications schedule. Optionally, adjusting by the fixed offset is cyclic when the adjustment is greater than a number of timeslots in the first uplink and downlink schedule.

In an embodiment, the first controller node is within communicative range of the second controller node and the method further comprises: generating a communication schedule by: initiating, by the first controller node, construction of the first uplink and downlink schedule for the first set of nodes; receiving, by the second controller node, communication between the first controller node and the first set of nodes; allocating, by the second controller node, the first redundant uplink and downlink schedule for communication between the second controller node and the first set of nodes based on the first uplink and downlink schedule; initiating, by the second controller node, construction of the second uplink and downlink schedule for the second set of nodes once construction of the first uplink and downlink schedule has been completed; receiving, by the first controller node, communication between the second controller node and the second set of nodes; and allocating, by the first controller node, the second redundant uplink and downlink schedule for communication between the first controller node and the second set of nodes based on the second uplink and downlink schedule.

In an embodiment the method further comprises: receiving, by each node in the first/second set of nodes, a first downlink communication containing a message via the first/second downlink schedule and a second downlink communication containing the message via the first/second redundant downlink schedule; and selecting, by each node, one of the first downlink communication or the second downlink communication for subsequent processing.

In an embodiment, each node selects the downlink communication with the strongest signal strength for subsequent processing.

Optionally, the strongest copy is the communication with the maximum received signal strength.

In an embodiment the node selects one of the first communication or the second communication periodically. Optionally, the node selects one of the first communication or the second communication after a predetermined number of cycles in the communication schedule.

In an embodiment the the node selects the strongest communication based on a first moving average of a signal strength for communications originating from the first controller node and a second moving average of a signal strength for communications originating from the second controller node.

In an embodiment, requesting, by the leak node, a downlink signal strength report from a node in the plurality of nodes; reporting, by the node, a signal strength of communications received from the first controller node and the second controller node; and determining, by the leak node, whether to transmit in the first/second downlink schedule or the first/second redundant downlink schedule based on the signal strength.

In an embodiment communicating with the first/second controller node comprises transmitting a message comprising data and an error correcting code.

Optionally, the error correcting code is a forward error correction.

In an embodiment the network comprises a coded physical layer and wherein, when a node incorrectly decodes a message, the node determines the message using majority logic and: a first communication originating from the first controller node, a second communication originating from the second controller node and a repeat transmission of the first communication from the first controller node.

In an embodiment each node transmits: a first uplink communication comprising data via the first/second uplink schedule; and a second uplink communication comprising forward error correction via the first/second redundant uplink schedule; and the method further comprises: decoding, by the leak node, the first uplink communication using the second uplink communication.

In an embodiment each node receives: a first downlink communication comprising data via the first/second downlink schedule; and a second downlink communication comprising forward error correction via the first/second redundant downlink schedule; and the method further comprises: decoding, by the leak node, the first downlink communication using the second downlink communication.

In an embodiment, the leak node performs maximum ratio combining taking into account the gain of the uplink and the downlink.

In an embodiment, the first uplink communication contains data only and the second uplink communication contains forward error correction only.

According to a fourth aspect there is provided a network comprising a leak node and a plurality of nodes logically distributed between a first set of nodes and a second set of nodes, the network configured so that: the first set of nodes communicates with a first controller node on a first frequency; and the second set of nodes communicates with a second controller node on a second frequency; wherein: the first frequency is different from the second frequency; and the first set of nodes and the second set of nodes communicate in parallel.

Also disclosed is a method of generating a communication schedule for a plurality of nodes in a multi-hop network, the plurality of nodes comprising a first node, the method comprising: receiving, by the first node, at least one downlink signalling (DLS) message; requesting, by the first node, a first resource allocation in the communication schedule by transmitting a request for slots (RFS) message; determining, by the first node, whether an assignment (ASG) message has been received; and requesting, by the first node, a second resource allocation in the communication schedule that is different from the first resource allocation if an assignment message (ASG) has not been received.

Optionally a resource allocation comprises: a time slot and a frequency channel; and the second resource allocation comprises: a time slot of the first resource allocation incremented by one time slot; and/or a different frequency channel from a frequency channel of the first resource allocation.

Optionally, the communication schedule is generated using a scheduling channel comprising a plurality of time slots wherein each timeslot is associated, in a cyclic pattern, with a different type of message.

Optionally, the cyclic pattern comprises a first timeslot for communicating downlink signalling (DLS) messages, a second timeslot for communicating request for slots (RFS) messages and a third timeslot for communicating assignment (ASG) messages.

Optionally, each node, apart from a controller node, has a parent node and wherein a downlink signalling message (DLS) comprises a transmission priority for each of the nodes for which it acts as a primary parent.

Optionally, the communication schedule comprises an uplink communication schedule and a downlink communication schedule.

Optionally, the first resource allocation in the communication schedule is in the uplink communication schedule if the child node does not act as parent to any node in the plurality of nodes.

Optionally, the method further comprises: receiving, by a second node in the plurality of nodes, the request for slots (RFS) message comprising the first resource allocation; determining, by a second node, whether a conflict exists in the communication schedule for the first resource allocation; and transmitting, by a second node, an assignment (ASG) message confirming the first resource allocation in the communication schedule if no conflict exists.

Optionally, the method further comprises: determining, by the first node, the timeslot of the first resource allocation based on: the transmission priorities in the downlink signalling message; and a next available timeslot for transmitting a request for slots as communicated in the DLS message.

Optionally, determining the timeslot of the first resource allocation is further based on: overheard transmissions from other nodes in the plurality of nodes;

Optionally, in response to receiving the downlink signalling (DLS) message DLS message, the first node requests a timeslot in the downlink communication schedule for each node of a plurality of nodes for which it acts as the parent.

Optionally, in response to receiving the downlink signalling (DLS) message, the first node requests a single timeslot in the downlink communication schedule for downlink communication with every node in the plurality of nodes for which it acts as parent.

Also disclosed is a method of generating a network topology in a multi-hop network. The method comprising transmitting, by a first node, a first route construction message comprising a rank of the first node; and receiving, by a second node, the first route construction message. The method further comprises: determining, by the second node, whether the rank of the first node is less than or equal to a parent rank, and if so: calculating, by the second node, a rank of the second node by incrementing the rank of the first node by one; assigning, by the second node, the first node as a parent in the network topology; and transmitting, by the second node to the first node, a route construction response message comprising the rank of the second node.

Optionally, in the above described method the rank represents the distance from a controller node in a number of hops and may be 0 for the parent node.

Optionally, the above described method is executed for a fixed duration based on the size of the network topology.

In an exemplary method of generating a network topology assigning the first node as the parent in the network topology comprises: associating the first node as one of a plurality of parent nodes when the rank of the rank node is equal to the parent rank; or associating only the first node as a parent node when the rank of the first node is less than the parent rank.

Optionally, the route construction response message transmitted by the second node comprises an indication that first node is a secondary parent node if the rank of the first node is equal to the parent rank.

Optionally, the route construction response message transmitted by the second node comprises an indication that the first node is a primary parent if the rank of the first node is less than the parent rank.

In another example the first node adds the second node as a child node in the network topology after receiving a route construction response message comprising a rank index equal to the first node's rank incremented by one.

In another example the first node adds the second node as a secondary child in the network topology after receiving a route construction response message comprising: a rank index equal to the first node's rank incremented by one; and an indication that the first node is a secondary parent node.

Optionally, the first node transmits the first route construction message on a plurality of different frequency channels. In this example the first node periodically scans the plurality of frequency channels after transmitting the route construction message.

Also disclosed is a method of generating a single hop topology in a network comprising a central node, a master controller, a slave controller and a plurality of nodes, wherein the master controller and the salve controller are in communicative range. The method comprising: transmitting, by the central node, a scheduling message comprising a timeslot allocation for each node of the plurality of nodes. The timeslot allocation comprising a first timeslot for transmitting from an association request message, and a second timeslot for receiving an association response. The method further comprises: transmitting, by a node in the plurality of nodes, an association request message in the first timeslot of the nodes timeslot allocation; receiving, by the master controller node and the salve controller node, the association request message transmitted by the node; determining, by the master controller node and the salve controller node, whether to form an association with the node; transmitting, by either of the master controller node or the salve controller node, an association response; and forming a parent node association with either of the master controller or the slave controller based on the receipt, by the node, of the response.

Optionally, in the above described method of generating a single hop topology there are N nodes in the plurality of nodes and nodes 1 to n receive an association response from the master controller 1302 while nodes n+1 to N receive an association request from the slave controller 1303.

FIG. 1 shows an illustration of a Wireless Battery Area Network (WiBaAN). FIG. 1 shows a battery system 100 comprising a plurality of Cell Monitoring Units (CMU) 101 and a Battery Management Unit (BMU) 102. In FIG. 1 the Wireless Battery Area Network (WiBaAN) is formed between the Cell Monitoring Units (CMU) 101 and the Battery Management Unit (BMU) 102. The network comprises single-hop and multi-hop connections between the Cell Monitoring units (CMU) 101 and the Battery Management Unit (BMU) 102. In a multi-hop communication path, communications to and from the Battery Management Unit (BMU) 102 are via an intermediary Cell Monitoring Unit (CMU) 101. In this way a number of different possible communication paths could exist. The Cell Monitoring Unit (CMU) 101 and the Battery Management Unit (BMU) 102 are more generally referred to as wireless nodes in a multi-hop network.

Figure 2A:
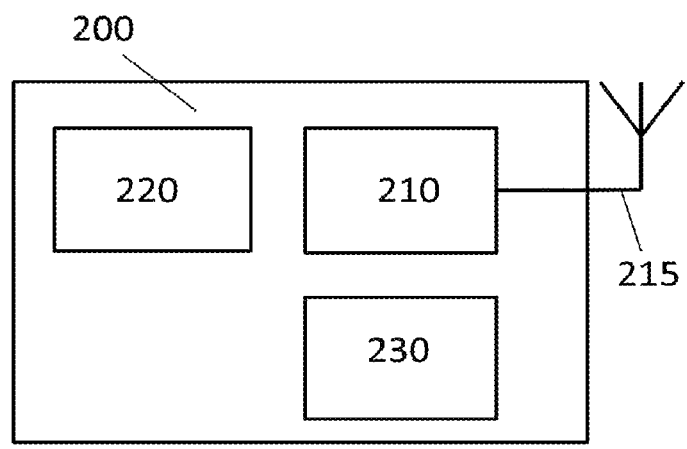
FIG. 2A shows an example of a wireless node according to an embodiment.

FIG. 2A shows an example of a wireless node according to an embodiment. The wireless node 200 comprises a wireless network interface 210, an antenna 215, a memory 230 and a processor 220. The wireless network interface 210 is configured to send and receive wireless signals via the antenna 215 in order to communicate with other wireless devices. The memory 230 stores computer readable instructions which, when executed by the processor 220, causes the processor 220 to perform the methods and processes described herein. The memory 230 may also comprise a record of overheard transmissions.

Figure 2B:
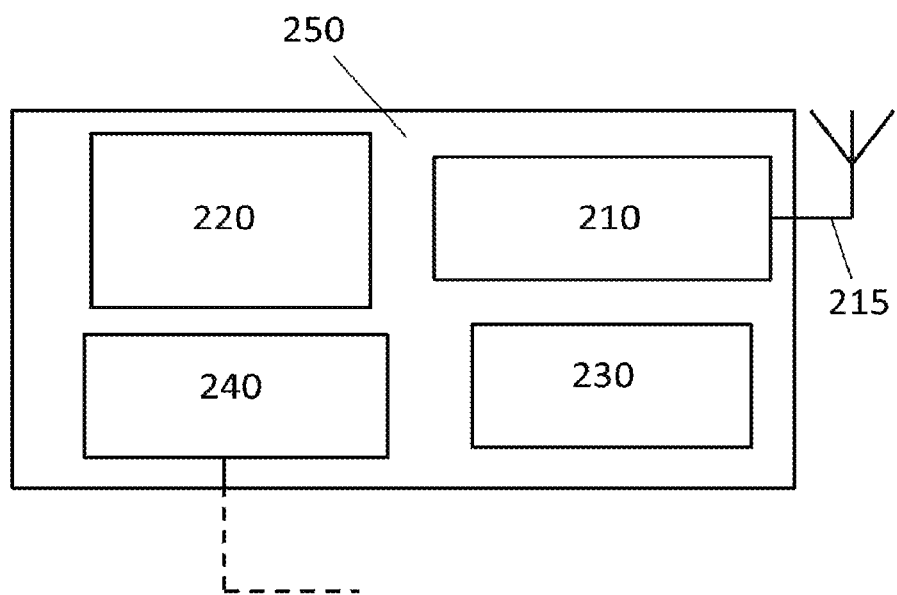
FIG. 2B shows a controller node according to an embodiment.

FIG. 2B shows a controller node according to an embodiment. A controller node 250 has at least the same functionality as a wireless node 200. As such, similar reference numerals denote similar components. Additionally the controller node 250 may also comprise a wired network interface 240 for communication with devices external to the wireless network. This allows the controller node 250 to perform the functions of a sink (by relaying transmissions out of the network) and/or a controller (by receiving instructions to control the network of devices). In FIG. 1 the Battery Management Unit (BMU) 102 is a controller node 250.

Figure 3:
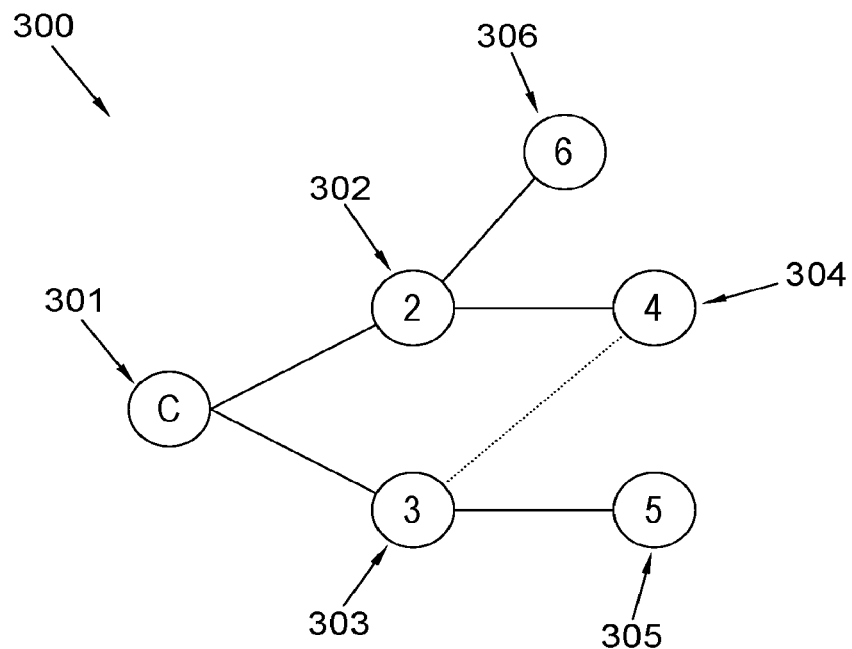
FIG. 3 shows a mesh network topology according to an embodiment.

FIG. 3 shows a mesh network topology according to an embodiment. FIG. 3 shows a mesh network 300 comprising a plurality of nodes including a controller node 301 and a plurality of other nodes 302-306. Each node in the mesh network is assigned a unique node ID. In FIG. 3 the controller node 301 is in communicative range of a second node 302 and a third node 303. The second node 302 is in communicative range of the controller node 301, a fourth node 304 and a sixth node 306 while the third node 303 is in communicative range of the controller node 301, the fourth node 304 and a fifth node 305.

The fourth node 304 is in communicative range of the second node 302, the third node 303 and a sixth node 306. The fifth node 305 is in communicative range of the third node 303 only and the sixth node 306 is in communicative range of the second node 302 and the fourth node 304. In this example two nodes are in communicative range of each other if a transmission by one of the nodes can be received by the other.

In FIG. 3, each line represents a path for uplink and/or downlink communications in a network topology. Although methods of generating a network topology will be discussed in more detail later, it is noted that even though a node may be in communicative range, it does not automatically mean that the node would be used for uplink/downlink communications. For example, even though the sixth node 306 is within communicative range of the fourth node 304, it is more optimal for uplink communications from the fourth node 304 to the controller node 301 to be routed via the second node 302 since it represents the path with the lowest number of intermediaries.

In an embodiment the controller node 301 is a Battery Monitoring Unit (BMU) and the plurality of other nodes 302-306 are Cell Monitoring Units (CMU).

One way of configuring and operating the mesh network is in accordance with the GALLOP (GenerAlised cLosed-Loop cOntrol in Process automation) protocol as described in U.S. patent application Ser. No. 15/487,079 which is incorporated herein by reference. GALLOP describes a protocol for operating a multi-hop network where messages are communicated from one node to another via intermediary nodes. In the downlink (i.e. communications from the controller node) messages intended for nodes further away from the controller are forwarded by nodes closer to the controller. Likewise, in the uplink (i.e. communications to the controller node) messages originating from nodes further away from the controller are relayed by nodes closer to the controller.

In this way each node in a multi-hop network is associated with at least a parent node or a child node, with most nodes having both a parent node and a child node. A parent node is a wireless node to which uplink communications are sent, and from which downlink communications are received. A child node is a wireless node to which downlink communications are sent and from which uplink communications are received.

Each transmission between nodes of the network is considered a "hop". Accordingly, messages can pass through the network by "hopping" between nodes until they reach their ultimate destination. GALLOP is agnostic to the Physical (PHY) layer design. In one arrangement, the PHY layer is based on Bluetooth technology, which is particularly attractive for industrial communication. GALLOP can be realized on either base rate (BR) or low energy (LE) Bluetooth radios. The PHY layer can also be based on Wi-Fi hardware. In one embodiment GALLOP is used in a network which operates in the 2.4 GHz ISM Band and utilises a bandwidth of 80 MHz.

One type of scheduling used in GALLOP is distributed bi-directional scheduling. In distributed scheduling there is no central entity scheduling communications and each node does not possess global knowledge of the network topology. In order to generate a distributed schedule, nodes in the network agree on the schedule through neighbour-to-neighbour information exchange.

A number of signalling messages are used to build a schedule in GALLOP, these include:
  Downlink-signalling (DLS) message. A Downlink-signalling (DLS) message is used by a parent node to begin the schedule construction procedure and contains schedule related information for the child nodes.
  Request-for-Slots (RFS) message. A Request-for-Slots (RFS) message is used by a node to request resources on either the uplink or the downlink communication schedule. Each message contains an indication of the timeslot requested for communications.

Assignment (ASG) message. An Assignment (ASG) message is used by a parent node to allocate resources in the uplink or downlink schedule in response to receiving a Request-for-Slots (RFS) message.

A plane of a network topology is an independent and parallel communication path. Multi-plane communication requires the use of diversity techniques (e.g. path diversity, frequency diversity and/or time diversity). Where a node is associated with multiple parent nodes there exists multiple different paths through which data could be communicated. Likewise, where nodes can use a plurality of different transmission frequencies there exists a plurality of different communication channels through which data could be communicated. By utilising the diversity present in the network it is possible to create a multi-plane communication schedule which is efficient and highly reliable.

Figure 4:
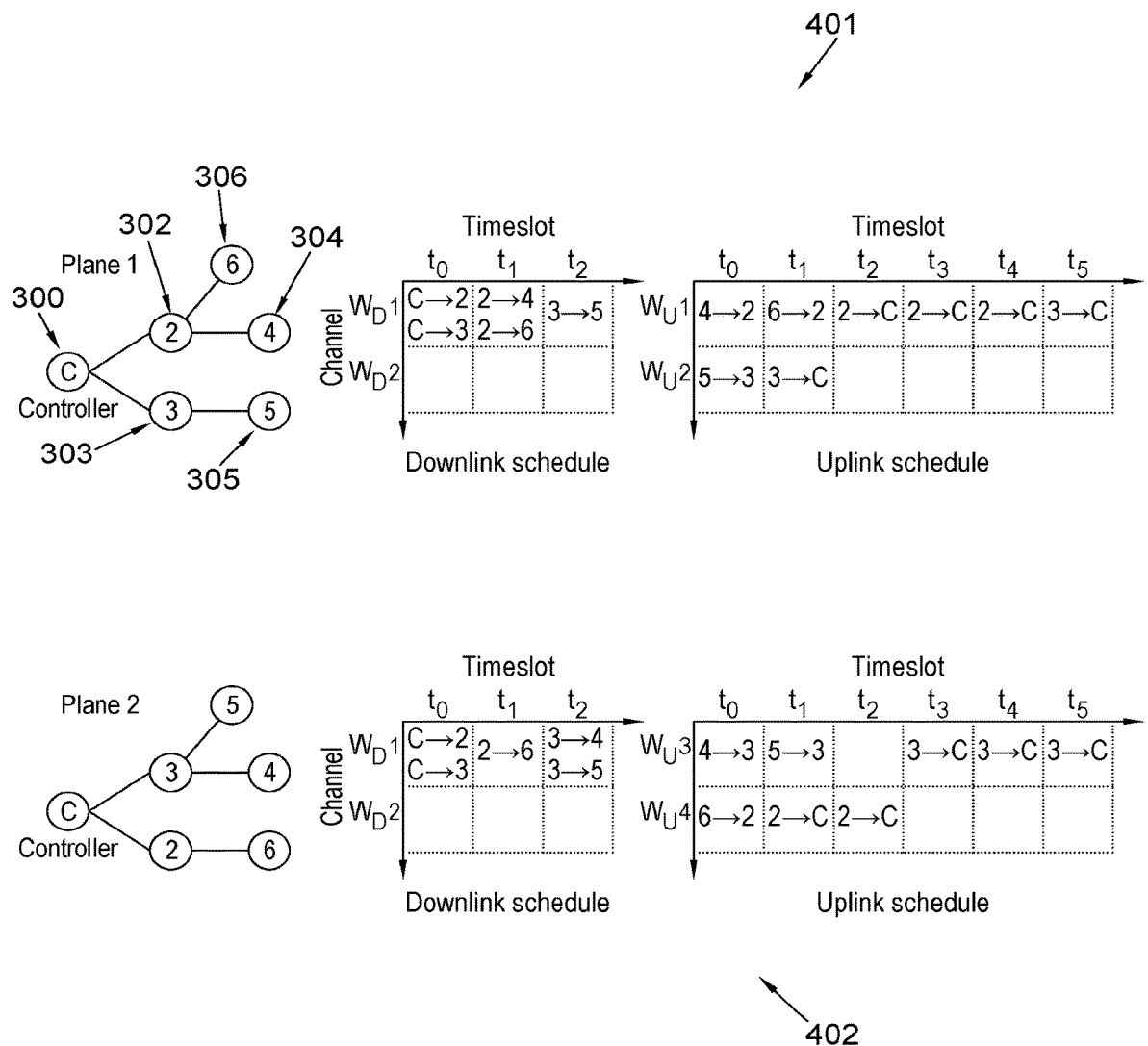
FIG. 4 shows a communication schedule with two independent planes and their corresponding schedule generated according to the GALLOP protocol.

FIG. 4 shows a communication schedule with two independent planes and their corresponding schedule generated according to the GALLOP protocol. FIG. 4 shows two arrangements of the mesh topology discussed in FIG. 3. In a first arrangement 401 the fourth node 304 communicates with the second node 302 for uplink and downlink communications. In a second arrangement 402 the fourth node 304 communicates with the third node 303 for uplink and downlink communications. Accordingly, different uplink and downlink communication schedules will be generated for these different topologies.

The different paths present in the mesh topology represent a form of diversity, namely path diversity. Where diversity exists within a network topology it is desirable to exploit this in order to achieve more efficient and reliable communications. Exploiting diversity leads to multi-plane communications where each plane represents an independent and parallel path between a source and a destination in a network.

One way of achieving multi-plane communication is to construct independent schedules for independent instances of the topology (e.g. the first arrangement 401 and the second arrangement 402) and integrate these schedules to exploit diversities (i.e. path, frequency, time diversity). This approach may be sub-optimal from a number of perspectives, not least that it requires the signalling procedure for generating a communications schedule to be completed multiple times (in this case once for each arrangement, i.e. twice).

Unlike the original construction process of GALLOP, the process disclosed herein achieves efficient multi-plane communication through a single signalling phase. Furthermore, in addition to being generally applicable to TDMA scheduling in multi-hop networks the techniques disclosed herein for generating a communication schedule are also backwardly compatible with the GALLOP protocol.

In the following examples it is assumed that the network topology is known, insomuch as each node knows its parent node and its child nodes.

Figure 5:
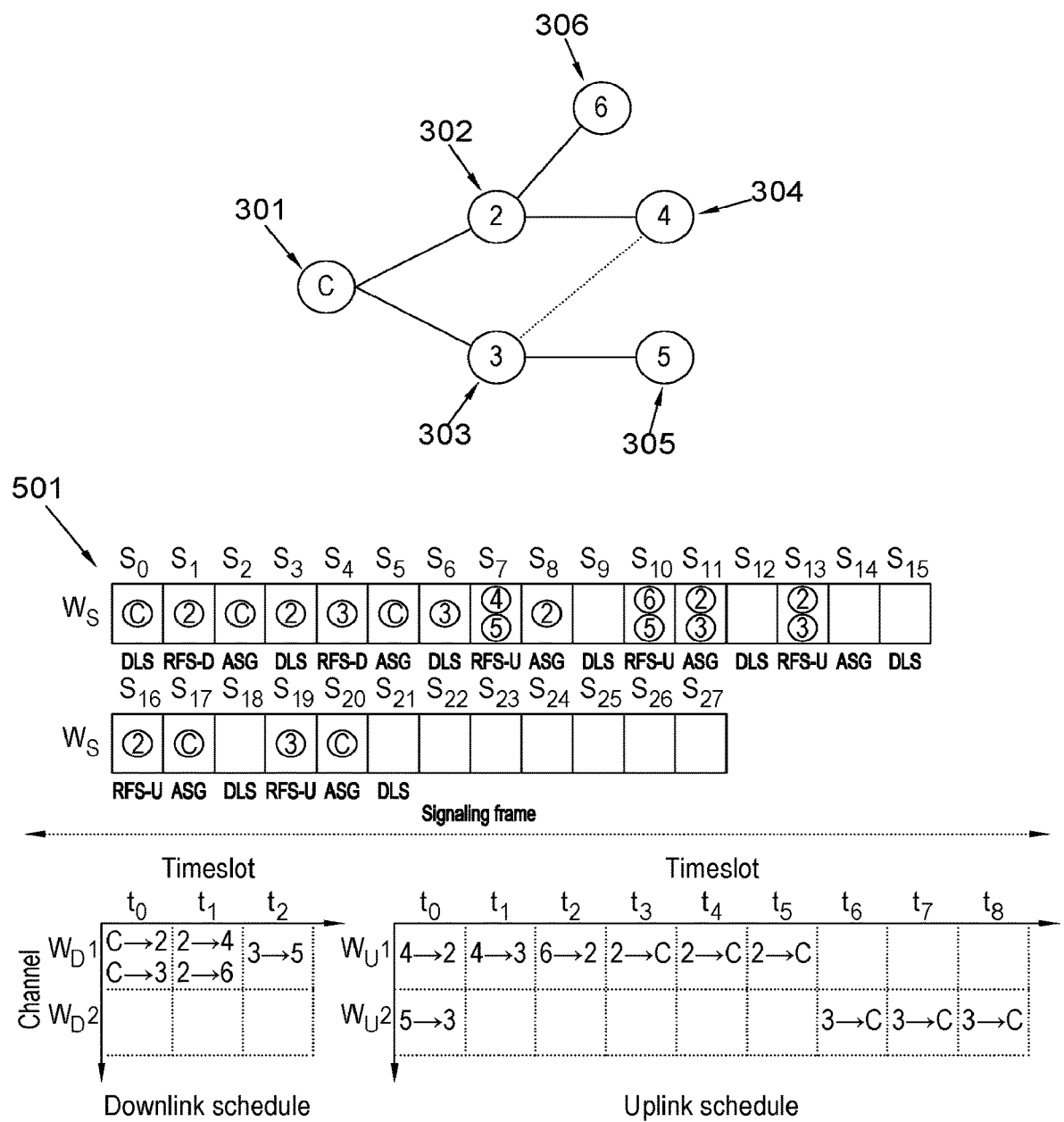
FIG. 5 shows a method of generating a communication schedule according to an embodiment.

FIG. 5 shows a method of generating a communication schedule according to an embodiment. FIG. 5 uses the same network topology as shown in FIG. 3, as a result a detailed discussion of the topology will be omitted. In FIG. 5 a scheduling channel 501 ($W_S$) is used to build a distributed schedule by exchanging messages with, and overhearing messages from, other nodes in the network.

The scheduling channel 501 ($W_S$) has a repetitive pattern of three distinct time slots. The first time slot ($S_0$) is used for the transmission of DLS, or downlink signalling, messages.

The DLS message transmitted by a parent node comprises downlink information and the transmission priorities of the parent's child nodes.

The second time slot ($S_1$) is used for sending RFS, or Request-for-slots, messages. A request-for slots message is used by a node to request resources on a communication channel (i.e. timeslots in the uplink or the downlink communication schedule). Each RFS message contains a requested resource allocation (i.e. a request timeslot in the uplink or downlink schedule). There are two types of RFS message in the embodiment of FIG. 5. Namely, RFS-U messages for requesting uplink resources and RFS-D messages for requesting downlink resources.

The third time slot ($S_2$) is used for the transmission of ASG, or Assignment, messages. ASG messages are used by a parent node to confirm an allocation of resources in the uplink or the downlink schedule in response to the transmission of a request-for-slots (RFS) message by the child node. If the parent node, based on its local knowledge, finds a conflict with the requested resource allocation (e.g. it is already allocated for communication) the ASG, or Assignment, message can contain a conflict free timeslot for use instead.

Since communications on the scheduling channel are cyclic the above sequence of timeslots repeats itself until both the uplink and downlink communication schedules have been formed.

For the purpose of generating a routing topology it is assumed that each node is aware of the neighbouring nodes. To initiate schedule construction the controller node 301 begins by transmitting a Downlink Signalling (DLS) message containing the relative transmission priorities of its child nodes, along with the next available signalling slot for a child node to transmit a request-for-slots, or RFS, message. In this example nodes with a lower node ID have a higher priority.

Each node that receives a Downlink Signalling (DLS) message calculates, based on their assigned priority, a signalling slot for requesting communications resources. For example, in FIG. 5, the second node 302 (with node ID '2') and the third node 303 (with node ID '3') both receive the Downlink signalling (DLS) message transmitted by the controller node 301. Since the DLS message transmitted in the first time slot ($S_0$) initiates the schedule construction process, the next available timeslot on the signalling channel for requesting resources is the first time slot ($S_1$).

Accordingly, based on the priorities of the child nodes, the second node 302 configures itself to request communication resources during the first time slot ($S_1$) and the third node 303 configures itself to request communication resources for communication with its child nodes during the next available timeslot for RFS messages after the first time slot ($S_1$), or in other words during the fourth time slot ($S_4$).

When requesting downlink resources nodes can either request distinct downlink timeslots for communicating with each of its child nodes or a single timeslot in the downlink schedule for broadcasting a message to all of its child nodes. In FIG. 5 the latter option is shown however, for the avoidance of doubt, it is emphasized that the schedule construction process discussed herein could equally be applied to the former option.

Since the controller node 301 requires downlink resources for communication with its child nodes (302 and 303) the controller node 301 informs the child nodes, in the DLS message, that the first available time slot on the downlink channel ($t_0$) has been taken, by the controller node 301 for downlink communications with its child nodes. Both the second node 302 and the third node 303 also have child nodes, consequently these nodes will also require communication resources in the downlink schedule.

The second node 302 requests a timeslot in the downlink schedule by transmitting a request-for-slot (RFS-D) message during the next available timeslot on the signalling channel, $S_1$, requesting the next available slot in the downlink schedule (i.e. $t_1$). Since there is no collision (i.e. the transmission is successfully received by the parent node, which in this case is the controller node 301) and there is no conflict (i.e. based on the controller nodes 301 local knowledge, this timeslot has not been allocated for communication) the parent (i.e. the controller node 301) confirms the resource request by transmitting an Assignment (ASG) message in the third timeslot of the scheduling channel (i.e. $S_2$). The second node 302 subsequently transmits a Downlink Signalling (DLS) message to its child nodes in the next available timeslot for DLS messages (i.e. timeslot $S_3$).

The Downlink signalling (DLS) message transmitted by the second node 302 comprises the priorities of the child nodes along with the next available timeslot in signalling channel ($W_S$) for requesting communication resources. Based on the contents of DLS message transmitted by the second node's 302 parent (i.e. the controller node 301), the second node 302 is aware that the next timeslot for RFS transmissions (i.e. $S_4$) is not available since this will be used by the third node 303. Consequently, the second node 302 transmits that the next available timeslot in the signalling channel ($W_S$) for transmitting RFS messages is timeslot $S_7$.

In timeslots $S_4$ to $S_6$ the third node 303 performs a similar process to that performed by the second node in time slots $S_1$ to $S_3$. Based on its local knowledge, the third node 303 requests the third timeslot ($t_2$) in the downlink schedule for downlink communications. Since the controller node 301 has not previously allocated the third timeslot ($t_2$) in the downlink schedule and since it hasn't overhead the third timeslot ($t_2$) being allocated by another node, the timeslot is conflict free according to the controller nodes 301 local knowledge. As a result, the controller node 301 confirms the requested resource allocation in the ASG message.

Had the timeslot not been conflict free (i.e. the timeslot had already been allocated/assigned for communication with other nodes) then the parent node (in this case the controller node 301) would allocate a new timeslot to the requesting node that is conflict free according to its local knowledge.

As part of the scheduling procedure the third node 303 transmits a downlink signalling (DLS) message. The downlink signalling message contains, amongst other things, the next available timeslot in schedule for the child nodes to request a resource allocation which, based on the local knowledge of the third node 303, is, timeslot $S_7$.

As will be noted, timeslot $S_7$ was also indicated by the second node 302 as being the next available opportunity for its child nodes to request a resource allocation. However, because the third node 303 is not within the neighbourhood, or range, of the second node 302, the third node is unaware of which timeslot is indicated in the DLS message transmitted by the second node 302. Consequently there is a chance that the transmissions from the second node's children (i.e. the fourth node 304 and the sixth node 306) will collide with the transmissions from the third node's children (i.e. the fourth node 304 and the fifth node 305).

The DLS message also comprises the transmission priorities for the child nodes. As discussed above, one option for generating transmission priorities is based on the 'Node ID' where nodes with a lower 'Node ID' generally have a higher priority.

One exception is where a multi-parent association exists (i.e. where a node has more than one parent for communications, e.g. a primary parent and a secondary parent). Multi-parent associations are treated different in each of the following embodiments. For example, in one embodiment a child with more than one parent node is only assigned a priority by the primary parent whereas in another embodiment the priority associated with a node that uses the parent node as a secondary parent will be lower than those nodes which use the parent node as a primary parent, irrespective of their 'Node ID'.

Although methods for generating topological relationship information, such as primary vs. secondary node selection, will be discussed in more detail later it is assumed for the purpose of creating a communications schedule that each node knows its neighbouring nodes. Furthermore, for the purpose of the below described method it is also assumed that if a node has a multi-parent association the node knows which parent node is the primary parent and which parent node is the secondary parent.

In the topology of FIG. 5 the fourth node 304 has a multi-parent association (i.e. it is within the neighbourhood, or communicative range, of the second node 302 and the third node 303). In this topology, this second node 302 is the primary parent and the third node 303 is the secondary parent.

With this in mind, the second node 302 assigns a higher priority to node 4, since it has the lowest 'Node ID' of the nodes for which it acts as the primary parent, and assigns a lower priority to node 6 306 since it has the highest 'Node ID' of the nodes for which it acts as the primary parent. In FIG. 5 the third node 303 does not account for secondary children (i.e. a child node that uses the third node 303 as the secondary parent) and therefore does not assign a priority to secondary children.

Based on the priorities and timeslots indicated in the Downlink Signalling (DLS) message from the second node 302, node 4 will request a resource allocation in timeslot $S_7$ (i.e. the next available timeslot for requesting resources based on the second nodes 302 local knowledge). Based on the priorities and timeslots indicated in the Downlink Signalling (DLS) message from the third node 303, node 5 will also request a resource allocation in timeslot $S_7$ (i.e. the next available timeslot for requesting resources based on the third nodes 303 local knowledge).

Nodes 4, 5 and 6 are known as leaf nodes since they do not have any child nodes. Consequently, these leaf nodes do not need to request downlink communication resources and instead begin building the uplink schedule by requesting uplink resources. Accordingly, in the timeslot assigned for requesting resources (i.e. $S_7$) the fifth node 305 transmits a request for uplink slots message (RFS-U). The fifth node 305 has not previously overheard any other uplink resource requests and as a result requests the first timeslot in the uplink, to.

In the embodiment of FIG. 5, the fourth node 304 transmits a multi-parent RFS uplink message (MP-RFS-U) because it has a multi-parent association. As part of this request the fourth node 304 requests two timeslots in the uplink schedule for uplink communication from the fourth node 304 to the primary parent (i.e. the second node 302) and the secondary parent (i.e. the third node 303). Like the fifth node 305, the fourth node 304 has also not overheard any other requests (or allocations) for uplink resources. As a result, the fourth node 304 requests resources in the uplink communications schedule at timeslot $t_0$ and $t_1$.

The request for uplink resources from the fourth node 304 and the fifth node 305 both occur during the same timeslot in the scheduling channel 501 (i.e. time slot $S_7$), and for the same resources in the uplink schedule i.e. $t_0$.

Because the fifth node 305 is not within the neighbourhood, or range, of the second node 302, the second node 302 will only receive the MP-RFS-U message transmitted by the fourth node 304 in timeslot $S_7$ (and not the RFS-U message transmitted by the fifth node 305). Since there is no conflict detected (e.g. two nodes requesting the same communication resources), the second node 302 confirms the resource request by transmitting an ASG message in scheduling channel 501 timeslot $S_8$.

In contrast to the second node 302, the third node 303 is within the range of the MP-RFS-U message transmitted by the fourth node 304 and the RFS-U message transmitted by the fifth node 305. The transmission of two signals at the same instant in time instant leads to a collision at the nodes which are within range of these transmitters, namely the third node 303. As a result of the collision, the fifth node 305 is not allocated an uplink resource allocation and must re-attempt a resource request in the next available RFS slot, which according to the fifth nodes local knowledge is timeslot $S_{10}$.

When a node unsuccessfully attempts a resource allocation (indicated by the absence of an ASG message from the parent node), the unsuccessful node will retransmit a request for resources wherein the requested resource are either incremented in the time domain or in the frequency domain. This is predominantly to avoid potential collisions in the uplink communications schedule.

For example, the original request for uplink communication resources from node 5 to node 3 was timeslot $t_0$, on a first uplink channel frequency $W_U^1$. If, following an unsuccessful attempt to acquire communication resources, the resource request is incremented in the frequency domain then the next resource request will be for timeslot $t_0$, on a second uplink channel frequency $W_U^2$.

In the embodiment of FIG. 5, following an unsuccessful attempt at resource allocation, the original resource request is incremented in the frequency domain.

During timeslot $S_{10}$ of the scheduling channel 501, both the sixth node 306 and the fifth node 305 transmit RFS-U messages. The sixth node 306 selects timeslot $S_{10}$ for a request for slot, or RFS, transmission based on the priorities in the DLS message transmitted by the second node 302 in timeslot $S_3$ while the fifth node 305 selects timeslot $S_{10}$ for a retransmission attempt since it is the next available slot according to its local knowledge (as it is not within the range of, and therefore did not overhear, the DLS message transmitted by the second node 302).

Because the second node 302 is not within the range of the fifth node 305 and because the third node 303 is not within the range of the sixth node 306, the two transmissions can occur at the same time without causing a collision. Accordingly both the second node 302 and the third node 303 confirm the resource allocation with the transmission of an ASG message in timeslot $S_{11}$ to the sixth node 306 and the fifth node 305 respectively.

Once each child node associated with a node has been allocated uplink resources the node then requests uplink resources from its own parent node. This is shown in timeslot $S_{13}$ of the scheduling channel 501 which shows the second node 302 and the third node 303 requesting a resource allocation from the controller node 301. Each node requests an uplink resource allocation for itself, and for a message from each of its child nodes.

For example, the third node 303 requests three uplink time slots, a first timeslot for uplink communication from the third node 303 to the controller node 301, a second uplink time slot for relaying communication received at the third node 303 from the fifth node 305 which is intended for the controller node 301 and a third uplink timeslot for relaying communication received at a third node 303 from the fourth node 304 which is intended for the controller node 301. In this way the third node 303 accounts for secondary communication (i.e. communication with a node which uses the third node 303 as a secondary parent) in its requested allocation. Likewise, the second node 302 requests uplink resources for itself and for communications received from the fourth node 304 and the sixth node 306.

Due to the simultaneous transmissions by the second node 302 and the third node 303 a collision occurs at the controller node 301. Consequently an ASG message is not transmitted by the controller node 301 causing the second node 302 and the third node 303 to reattempt a resource allocation. To do this, each node takes into account their assigned priorities to determine when to reattempt a resource allocation. For example, the second node 302 is a higher priority than the third node 303. As a result, the second node re-attempts a resource allocation during the next available timeslot for requesting resources (i.e. timeslot $S_{16}$) while the third node 303 reattempts resources in next available timeslot after the second node 302 will reattempt an allocation (i.e. timeslot $S_{19}$).

The third node 303 can infer (from the collision at the third node 303 in timeslot $S_7$) that timeslot $t_0$ in the uplink is taken. However, the third node 303 is unaware that that the message in timeslot $S_7$ from the fourth node also contained a request for uplink timeslot $t_1$. Consequently, a potential conflict could arise if the third node 303 requests uplink timeslot $t_1$ for uplink communications with the controller node 301 (which based on its local knowledge would be allowable).

Although the third node 303 didn't successfully receive a MP-RFS-U message, a potential conflict on the uplink schedule at timeslot $t_1$ could arise if the third node 303 requests this timeslot (since these uplink resources have already been allocated by the second node 302 in response to the fourth nodes 304 transmission). This conflict can be avoided by the controller who has successfully overheard the ASG message from node 2 in slot $S_8$.

In this example, the third node 303 requests timeslot $t_1$ for uplink communications with the controller node 301 however because this timeslot is already allocated according to the controller nodes 301 local knowledge, the controller node 301 will transmit an updated allocation containing a timeslot allocation that is conflict free according to the controller nodes 301 local knowledge. In light of this the third node 303 obtains timeslots $t_6$-$t_8$. These timeslots could optionally be on either the first uplink channel or the second uplink channel.

Unlike the signalling procedure disclosed in GALLOP, a multi-packet request-for-slots message (e.g. MP-RFS-U) solicits an Assignment (ASG) message if it is received by the secondary parent as well. If the secondary parent successfully receives the MP-RFS message it includes, or "piggybacks", the allocation of resources on an Assignment (or ASG) message intended for any of its primary child nodes. This augmented message is known as a MP-ASG, in order to differentiate it from a normal ASG message.

The rationale behind using a MP-ASG is that a timeslot reserved for secondary communication may or may not be free based on the local knowledge of secondary parent. As a result, it is advantageous if the secondary parent can confirm that the requested resource is conflict free, or if it is not, allocate a new timeslot for secondary communication according to its local knowledge. The primary parent may also piggyback the secondary allocation information on its RFS message for enhanced dissemination since nodes overhear to maintain and update their local knowledge of conflict free timeslots.

In summary, the process of generating uplink and downlink communication schedules in a multi-hop network discussed above has the following proprieties:

The uplink and downlink schedule construction is carried out in a single signalling phase.

Multi-packet request-for-slots message are used by a child node with multi-parent association.

A leaf node begins building the uplink schedule once the node receives a Downlink-Signalling (DLS) message.

The signalling channel 610 comprises a cyclic pattern of timeslots, wherein the first timeslot is used for transmitting and receiving Downlink-Signalling (DLS) messages, the second timeslot is used for transmitting and receiving Request-for-slots (RFS) messages and the third timeslot is used for transmitting and receiving Assignment (ASG) messages.

Where a node has a multi-parent association it transmits a multi-parent request-for-signals (MP-RFS) message.

Where a collision is detected by a node, the node increments the requested resources in the time domain or in the frequency domain for use during the next attempted resource allocation.

Child nodes request resources in the order of their priorities.

Child nodes that use a node as the secondary parent are not assigned a priority.

A parent node defers requesting uplink resources for itself until all the primary child nodes have been successfully allocated resources.

In an alternative embodiment, a separate request-for-slots message (as opposed to a multi-packet request-for-slots (MP-RFS) message) is used by a node with multi-parent association to request resources from the primary and the secondary parent.

Figure 6:
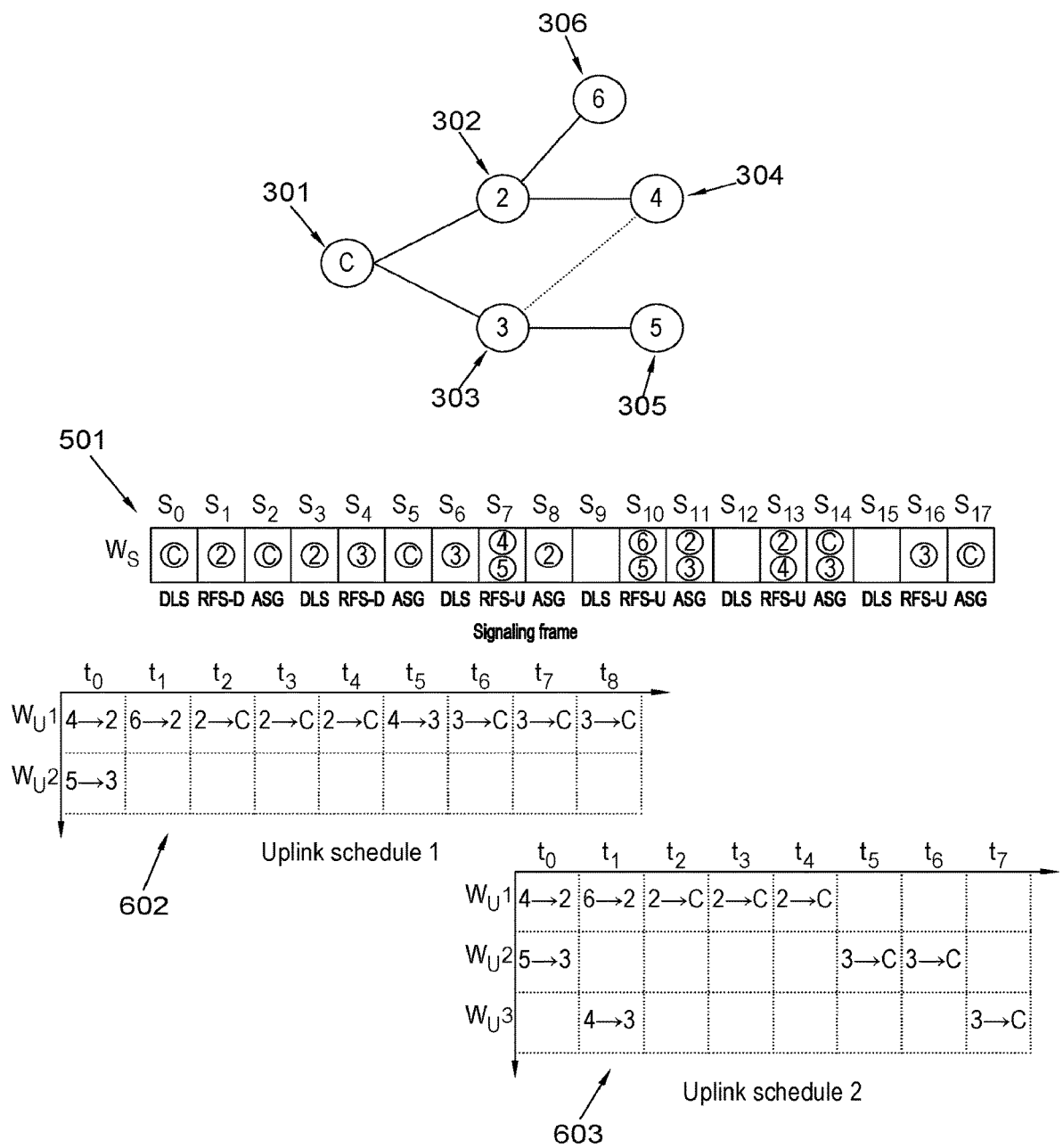
FIG. 6 shows a method of generating of a communication schedule according to an embodiment where a separate request-for-slots (RFS) message is used for each parent.

FIG. 6 shows a method of generating of a communication schedule according to an embodiment where a separate request-for-slots (RFS) message is used for each parent. In FIG. 6 similar reference numerals are used to identify similar integers to FIG. 5, as such a detailed discussion will be omitted. The scheduling channel 501 follows a similar series of communications as discussed in relation to FIG. 5 up to timeslot $S_7$.

The fourth node 304 is informed, from the downlink-signalling (DLS) message transmitted by the second node 302 in timeslot $S_3$ that the next available time slot for requesting resources is timeslot $S_7$. Likewise, the fifth node 305 is informed, from the downlink-signalling (DLS) message transmitted by the third node 303 that the next available time slot for requesting resources is timeslot $S_7$.

In FIG. 6 the fourth node 304 transmits an RFS message, requesting to in the uplink schedule. At the same time (i.e. timeslot $S_7$) the fifth node 305 also transmits a RFS-U message. Since the third node is within the communicative range of both the fourth node 304 and the fifth node 305, these simultaneous transmissions cause a collision at the third node 303. Accordingly, no ASG message is transmitted by the third node 303 and the fifth node 305 has to re-attempt transmission on the next available RFS timeslot, which according to its local knowledge is $S_{10}$.

In this embodiment, after the fourth node 304 has been allocated uplink resources (i.e. $t_0$, $W_U^1$) for communication with the primary parent (i.e. the second node 302), the fourth node 304 then requests uplink resources for communication with the secondary parent (i.e. the third node 303). The fourth node knows, based on the DLS message from the second node 302 that the sixth node 306 will be transmitting an RFS message during the next RFS timeslot, $S_{10}$. As a result, the next available RFS timeslot when the fourth node 304 can transmit a message to the third node 303, and not interfere with the transmissions at the second node 302, is timeslot $S_{13}$.

In the embodiment of FIG. 6, each parent node only requests resources for itself in the uplink communication schedule once resources have been allocated for all of the node's children (i.e. both primary and secondary children). This is in contrast to the example of FIG. 5 where a parent node only requests resources for itself once all of the primary children have been assigned communication resources.

When requesting a resource allocation the nodes take into account the communications of the parent nodes and the sibling nodes (i.e. other children of the same parent node) that they have overheard. For example, Node 4 is aware, from the DLS message transmitted by the second node 302 that the second node 302 has one other child node, namely the sixth node 306. Based on an assumption that the sixth node 306 doesn't have any child nodes it is possible to select an uplink resource allocation that reduces the possibility of a collision in the uplink schedule.

Based on this assumption the fourth node 304 knows that timeslot $t_1$ could be requested by the sixth node 306 for communication with the second node 302. Likewise, the fourth node 304 knows that timeslots $t_2$, $t_3$ and $t_4$ could potentially be allocated for uplink communication originating from the second node 302 and uplink communications via the second node 302 which originate from the fourth node 304 and the sixth node 306.

In light of this, as part of the second uplink Request-for-Slots (RFS-U) message transmitted in timeslot $S_{13}$ the fourth node 304 requests timeslot $t_5$ for communication with the third node 303 if the network comprises a single frequency channel (i.e. where there is only one uplink frequency and therefore no frequency diversity).

In a different embodiment communications between a node and the primary or secondary parent can be realised on separate frequency channels.

FIG. 6 shows a first uplink schedule 602 where a single frequency channel is present. The uplink schedule shows two channels formed by the different non-interfering paths in the network topology of FIG. 6.

FIG. 6 also shows a second uplink schedule 603 that uses two frequency channels. The first frequency channel comprises the uplink channels $W_U^1$ and $W_U^2$ based on the path diversity present within the topology, and also comprises the uplink channel $W_U^3$ which exploits the frequency diversity of the topology. Where a separate frequency channel is present the fourth node 304 requests the first available slot, based on its local knowledge, for communication with the secondary parent. Since the fourth node 304 is already transmitting (on channel $W_U^1$) to the second node 302 in the timeslot $t_0$ it requests timeslot $t_1$ on the second frequency channel ($W_U^3$) for communications with the second parent (i.e. the third node 303).

Following the allocation of uplink resources for all of the third node's children, the third node 303 continues to construct the schedule in accordance with the process described in FIG. 5, namely by requesting uplink resources for communication to its parent node.

FIGS. 5 and 6 show how a distributed communication schedule can be generated for multi-plane communications. As previously discussed, multi-plane refers to independent and simultaneous non-interfering communication channels. In FIG. 5 a first plane is formed by communications from the fourth node 304 to the controller node 301 via the second node 302. A second plane is also formed by communications from the fourth node 304 to the controller node 301 via the third node 303. Furthermore, as shown in the second uplink schedule 603 of FIG. 6, further planes can also be obtained by exploiting different frequency channels. Using path, frequency and time diversity in the manner described above leads to very high-reliability.

In summary, the process of generating a communication schedule in a multi-hop network discussed in relation to FIG. 6 has the following proprieties, instead of, or in addition to those of the example shown in FIG. 5:

A separate uplink request-for-slots message is used for the primary parent and the secondary parent.

A parent node does not request uplink resources until each of its child nodes (i.e. both primary and secondary child nodes) have been allocated uplink resources.

A node requests an uplink resource allocation for communication with the secondary parent based on the assumption that other siblings have no child nodes.

Where a second frequency channel exists, communication with a secondary parent can be allocated resources on the second frequency channel.

Figure 7:
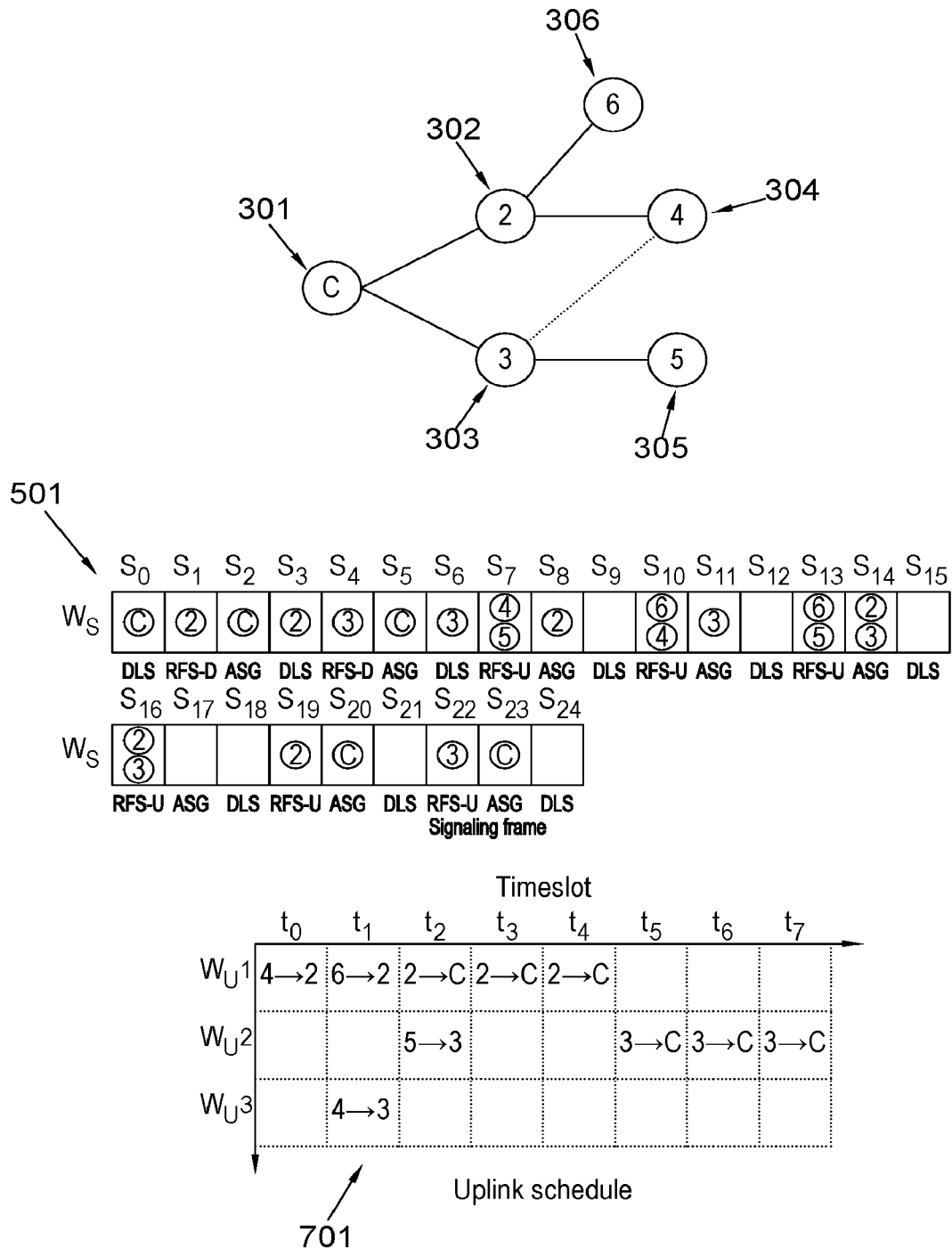
FIG. 7 shows a method of generating a communication schedule according to an embodiment where a separate request-for-slots (RFS) message is used for communication with each parent node and the parent nodes account for secondary child nodes in a DLS message.

FIG. 7 shows a method of generating a communication schedule according to an embodiment where a separate request-for-slots (RFS) message is used for communication with each parent node and the parent nodes account for secondary child nodes in a DLS message. In FIG. 7, the topology of FIG. 3 is used to demonstrate the process of generating a communication schedule. The scheduling channel 501 follows a similar series of messages as discussed in relation to FIG. 5 up to timeslot $S_7$.

In the method of generating a communication schedule shown in FIG. 7 each parent node accounts for secondary child nodes in the DLS message by assigned secondary child nodes a priority. In FIG. 7 a secondary child node (i.e. a node that uses said parent as a secondary parent node) has a lower priority than any other node that uses the parent as a primary parent. In the Downlink-signalling message transmitted by the third node 303, the fifth node 305 will be assigned the highest priority (as the primary child with the lowest 'Node ID') and the fourth node 304 will be assigned the lowest priority (as the secondary child node).

As a result, when the fifth node 305 selects a timeslot in the scheduling channel 501 for retransmission of a RFS message (due to the absence of an ASG message from its request in timeslot $S_7$ as a result of the collision at the third node 303) it will select $S_{13}$ because, based on the DLS message transmitted by the third node 303, the fourth node 304 will be transmitting in during the timeslot $S_{10}$.

Based on the DLS message transmitted by the second node 302, the sixth node 306 will attempt to request uplink resources in the timeslot $S_{10}$. As discussed above, the fourth node 304 will also be requesting uplink resources (albeit for communication with the third node 303) at the same time. Consequently, a collision will occur at the second node 302 prompting a retransmission of the RFS-U message from the sixth node 306.

This retransmission occurs in timeslot $S_{13}$ of the scheduling channel 501 along with the retransmission from the fifth node 305 to the third node 303. Since the second node 302 is not in communicative range of the fifth node 305, and because the sixth node 306 is not within communicative range of the third node 303, simultaneous transmissions will not cause a collision.

After receiving the RFS message from the fifth node 305, the third node 303 confirms the requested resource allocation. In this example the requested resource in the uplink communication schedule is timeslot $t_2$ since the fifth node 305 is aware that the previous timeslot (i.e. $t_1$) is used by the fourth node 304 for communication with the third node 303 (from receiving the ASG message transmitted in slot $S_{11}$). Scheduling communications from the third node 303 to the fifth node 305 on earlier uplink schedule timeslots might lead to conflicts since these slots could potentially be occupied by other users.

Where a multi-parent association exists, the secondary parent node (i.e. the third node 303) has two options for dealing with communications from the secondary child (i.e. the fourth node 304). One option is for the secondary parent to make itself available (e.g. by activating its transceivers) for the secondary child's (i.e. the fourth node's 304) communication with its primary parent (i.e. the second node 302), in this case at timeslot $t_0$ of the uplink schedule. In this example, the secondary child node (i.e. the fourth node 304) includes information of the resources allocated for communication with the primary parent in the request for slots message (RFS) transmitted to the secondary parent. In this way, the secondary parent is able to know when the secondary child node (i.e. the fourth node 304) communicates with its primary parent (i.e. the second node 302).

Alternatively a second resource in the uplink schedule can be allocated, optionally on a second channel, for this communication as shown in the uplink schedule 701. The second option is chosen when the timeslot used for a node to communicate with its primary parent is already being used by the secondary parent for communication with a different node.

Figure 8:
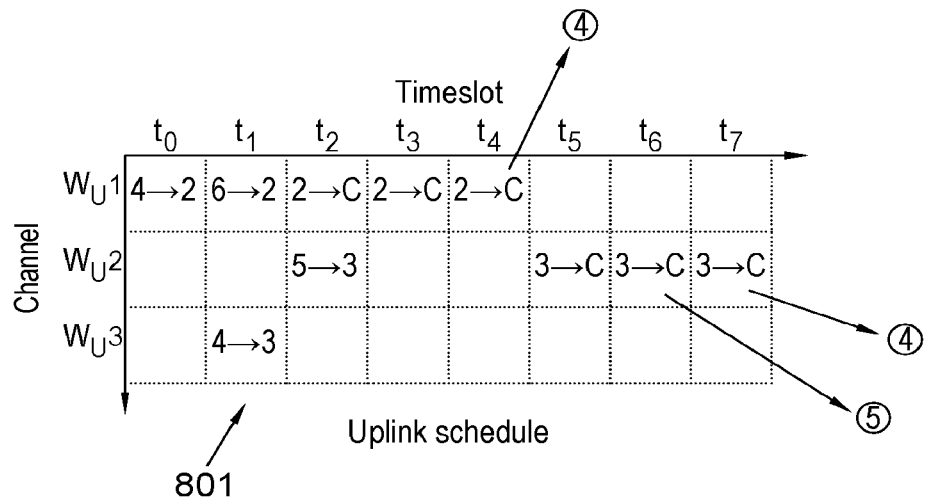
FIG. 8 shows two options for relaying information from a secondary child node according to an embodiment.
Figure 8:
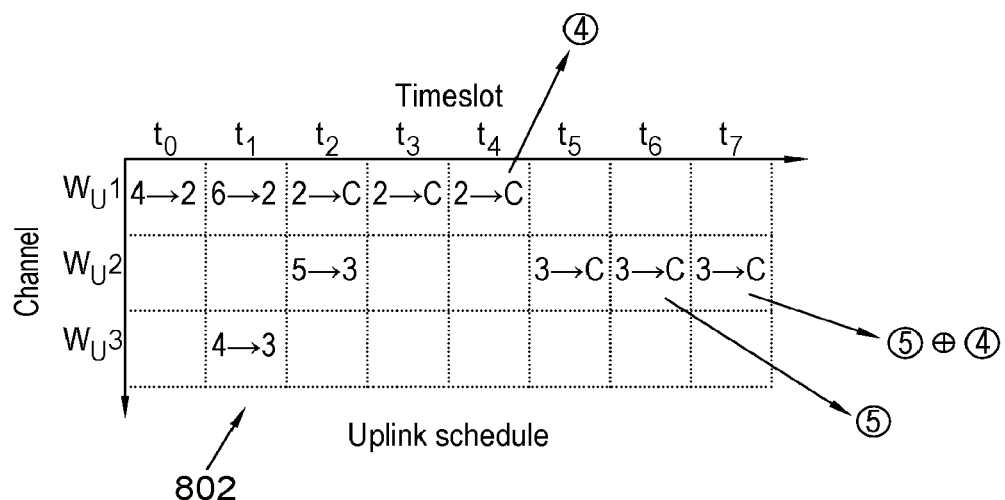

FIG. 8 shows two options for relaying information from a secondary child node according to an embodiment. FIG. 8 shows a first uplink schedule 801 and a second uplink schedule 802. The first and second uplink schedules (801 and 802) are generated in accordance with the method of generating a communication schedule discussed in relation to FIG. 7. While the uplink schedules shown in FIG. 8 are the same, the contents of the messages transmitted by a parent node with a secondary child node are different.

In the first uplink schedule 801 the three timeslots ($t_5$, $t_6$ and $t_7$) allocated to the third node 303 are used to communicate: data generated by the third node 303, data generated by the fourth node 304 which is received by the third node 303 and data generated by the fifth node 305 which is received by the third node 303.

In the second uplink schedule 802 the three timeslots ($t_5$, $t_6$ and $t_7$) allocated to the third node 303 are used to communicate: data generated by the third node 303, data generated by the fifth node 305 which is received by the third node 303 and an encoded message generated based on the transmissions of the fourth node 304 and the fifth node 305.

In the second uplink schedule 802 the third node 303 performs an XOR operation on the transmissions received from the fourth node 304 and the fifth node 305. The third node 303 subsequently transmits this encoded message to the controller in the uplink timeslot $t_7$. Transmitting the linear combination of the two messages is advantageous for latency and reliability.

For example, if $X_5$ denotes the uplink transmission of the fifth node 305, and $X_4$ denotes the uplink transmissions from the fourth node 304, then the encoded transmission from the third node, $X_{3(4,5)}$, is $X_4 \oplus X_5$. With knowledge of the encoded transmission (i.e. $X_4 \oplus X_5$) and one of its constituent parts (e.g. $X_4$) it is possible to determine the other constituent part (i.e. $X_5$). For example, if the transmission of the fourth node 304 fails via the first plane (i.e. via the second node 302) the controller node 301 can recover the transmission of the fourth node from the second plane (i.e. via the third node 303). Likewise, if the transmission by the third node 303 of the fifth nodes message in timeslot $t_6$ fails, it is possible to recover the transmission of the fifth node using the encoded transmission in timeslot $t_7$ and the transmission of the fourth node 304 transmitted in timeslot $t_4$.

Figure 9:
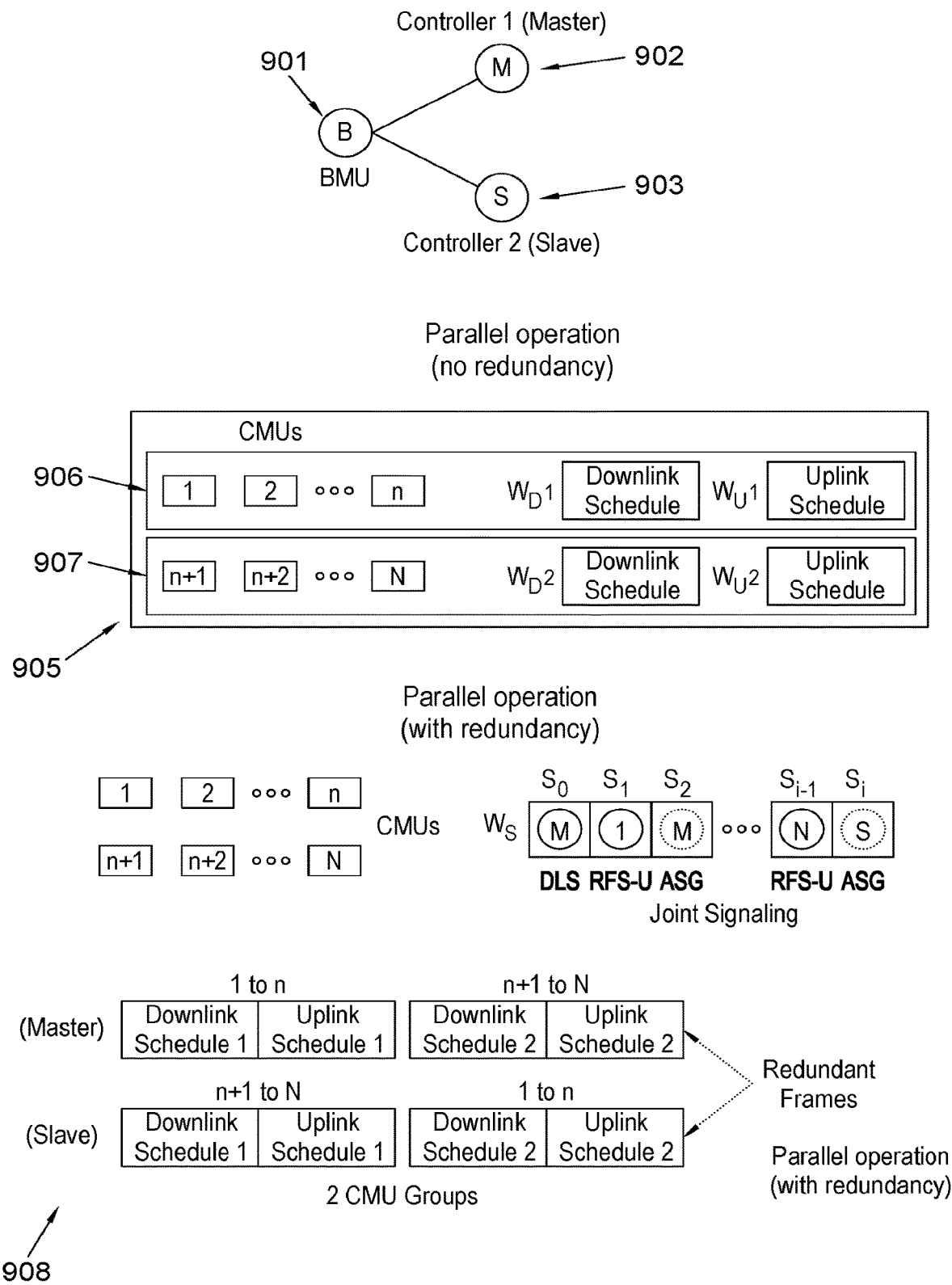
FIG. 9 shows the generation of a communication schedule using parallel operation according to an embodiment.

FIG. 9 shows the generation of a communication schedule using parallel operation according to an embodiment. FIG. 9 considers a topology where there exists multiple controller nodes, each controller managing a network of nodes (e.g. Cell Monitoring Units). FIG. 9 shows a central node 901 (e.g. a Battery Management Unit 901) connected to a plurality of controller nodes comprising a first controller 902 and a second control 903. Using a plurality of controllers to control and manage communications is particularly attractive from a latency perspective as independent networks can operate in parallel, optionally on orthogonal frequency resources. Furthermore, using a plurality of controllers to manage nodes enables a plurality of networks to be formed enabling the exploitation of different channel coding techniques for enhanced reliability without incurring significant latency. Optionally, the number of controller nodes is at least two.

In the topology of FIG. 9 it is assumed that the plurality of controllers are in direct radio coverage, or range, of each other. This situation is reasonably likely in a battery management system due to the physical constraints present. In the topology of FIG. 9 there are N nodes (not shown) and two controllers, namely the first controller 902 and the second controller 903.

In an embodiment the N nodes (e.g. cell monitoring units (CMU's)) in the topology are logically split so half the nodes use the first controller 902 for communication with the central node 901 (e.g. the BMU) while the other half use the second controller 903 for communication with the central node 901. Assuming the nodes are static, which is reasonably likely since the positions of the cell monitoring units (CMU) do not change in use, there can be an a priori association of the N nodes to either controller. For example, node 1 to node n could be associated with the first controller 902 and node n+1 to node N could be associated with the second controller 903 (optionally, where n=N/2). Based on this a priori knowledge, the nodes can generate a communication schedule using the methods described above and in GALLOP more generally.

This approach is shown in a parallel communication schedule 905 comprising a first communication schedule 906 and a second communication schedule 907. The first communication schedule 906 comprises an uplink and downlink schedule ($W_U^1$ and $W_D^1$) for nodes 1 to n and the second communication schedule 907 comprises an uplink and downlink schedule ($W_U^2$ and $W_D^2$) for nodes n+1 to N. When utilising parallel operation the nodes communicate with their associated controller at the same time, in parallel. In this example each controller communicates on a different frequency channel from a fixed set of channels. Optionally, each channel in the fixed set of channels is orthogonal.

In a further embodiment a communication schedule is generated which uses parallel operation and redundancy. When using parallel operation with redundancy a node from the plurality of controller nodes is selected as the master controller.

In order to segregate the topology into sets associated with each controller the master controller begins the schedule construction by transmitting a DLS message (as shown in timeslot $S_0$ of the scheduling channel $W_S$). One of the controllers (e.g. the master controller) assigns priorities to all CMUs through the DLS message in the first slot of the signalling channel. Following this, nodes request resources from the controllers they are associated with using the procedure for generating a communication schedule discussed above. Optionally, the process of associating nodes with the plurality of controller nodes takes place at the beginning of the schedule construction. The allocation process follows the RFS-ASG process described in relation to FIG. 5.

When a node (e.g. a Cell Monitoring Unit (CMU)) requests resources from the controller node to which they are associated, the other controller passively listens and allocates the same resources for communication with the node on a redundant frame (i.e. a series of communications in the uplink/downlink schedules which convey redundant copies of data), on a different channel. This is possible since the controllers (e.g. the first controller 902 and the second controller 903) are within direct radio coverage, or range, of each other. For example, FIG. 9 shows a parallel communication schedule with redundancy 908 generated by the slave controller passively listening to the resources allocated by the master controller to its associated nodes (i.e. nodes 1 to n) and allocating the same sequence of resources for nodes 1 to n in the redundant from of the slave controller, and vice versa.

Where parallel operation with redundancy is implemented the two groups of nodes (i.e. nodes 1 to n and nodes n+1 to N) communicate simultaneously with their associated controller before switching to a different set of channels and repeating their transmissions on the redundant frame (with a different controller). This occurs for both the uplink and downlink communication schedules, optionally the switch between controllers for communicating the redundant frames takes place after the first downlink and the first uplink schedule have completed as shown in the parallel communication schedule with redundancy 908.

By scheduling communications using parallel communications with redundant frames the communication schedule is able to provide high reliability with deterministic latency. This approach can be used in both single-hop and multi-hop networks.

Different approaches to parallel operation of a network comprising a plurality of controller nodes can also be used to increase reliability.

Figure 10:
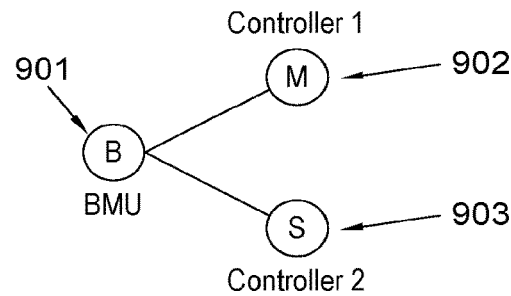
FIG. 10 shows a communication schedule generated using parallel operation for a plurality of multi-parent nodes according to an embodiment.
Figure 10:
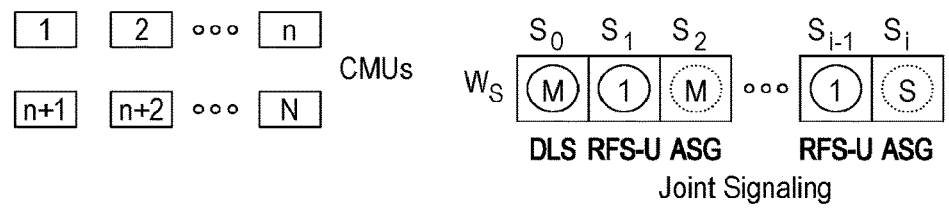
Figure 10:
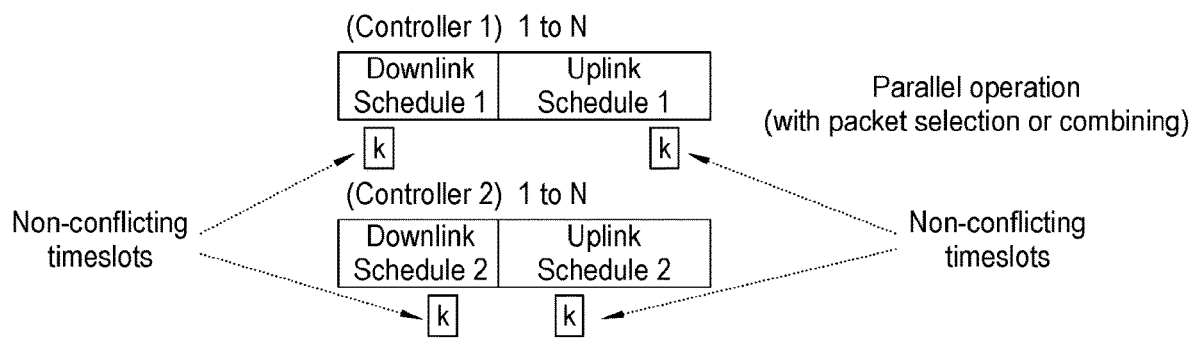

FIG. 10 shows a communication schedule generated using parallel operation for a plurality of multi-parent nodes according to an embodiment. Like FIG. 9, FIG. 10 relates to a topology comprising a plurality of controllers, specifically a first controller 902 and a second controller 903. In the topology there is a multi-parent association between the controllers and the nodes (not shown). In this embodiment each node (e.g. Cell Monitoring Unit (CMU)) is assigned two separate timeslots in the uplink and downlink schedules where each timeslot is associated with communication via a different controller.

To generate the communication schedule the nodes obtain timeslots from both controllers. Firstly from the master controller, which in FIG. 10 is the first controller 902, and secondly from the slave controller, which in FIG. 10 is the second controller 903. This is achieved by using a joint signalling phase as in FIG. 9.

In order to prevent conflicts it is necessary for a node to be assigned a timeslot on the communications schedule for the master controller which is different to the timeslot on the communication schedule for the slave controller. This is achieved by the slave controller overhearing communications to and from the master node during the generation of the communication schedule.

The slave controller passively listens to ASG messages in order to determine the timeslots assigned to a node for communication. If $t_m$ is the timeslot allocated to a node on the master schedule, then the slave controller allocates a timeslot $t_n$ which is computed as modulo($t_m+O_f$, $M_n$), where $O_f$ denotes a fixed offset and $M_n$ denotes a number of slots in the master schedule.

The number of slots in the master schedule, $M_n$, is available at the slave controller since the nodes (e.g. the CMUs) only start requesting resources from the slave controller after allocation from the master controller and after completion of master scheduling phase. As discussed above, in this embodiment each of the nodes also request a resource allocation from the slave controller. In response to the resource request, the slave controller allocates resources in the communications schedule based on the allocations from the master controller that were obtained through passive overhearing.

Once a parallel communication schedule (e.g. as shown in FIG. 10) has been generated there are a number of different ways that the multiple transmission opportunities can be exploit.

Figure 11:
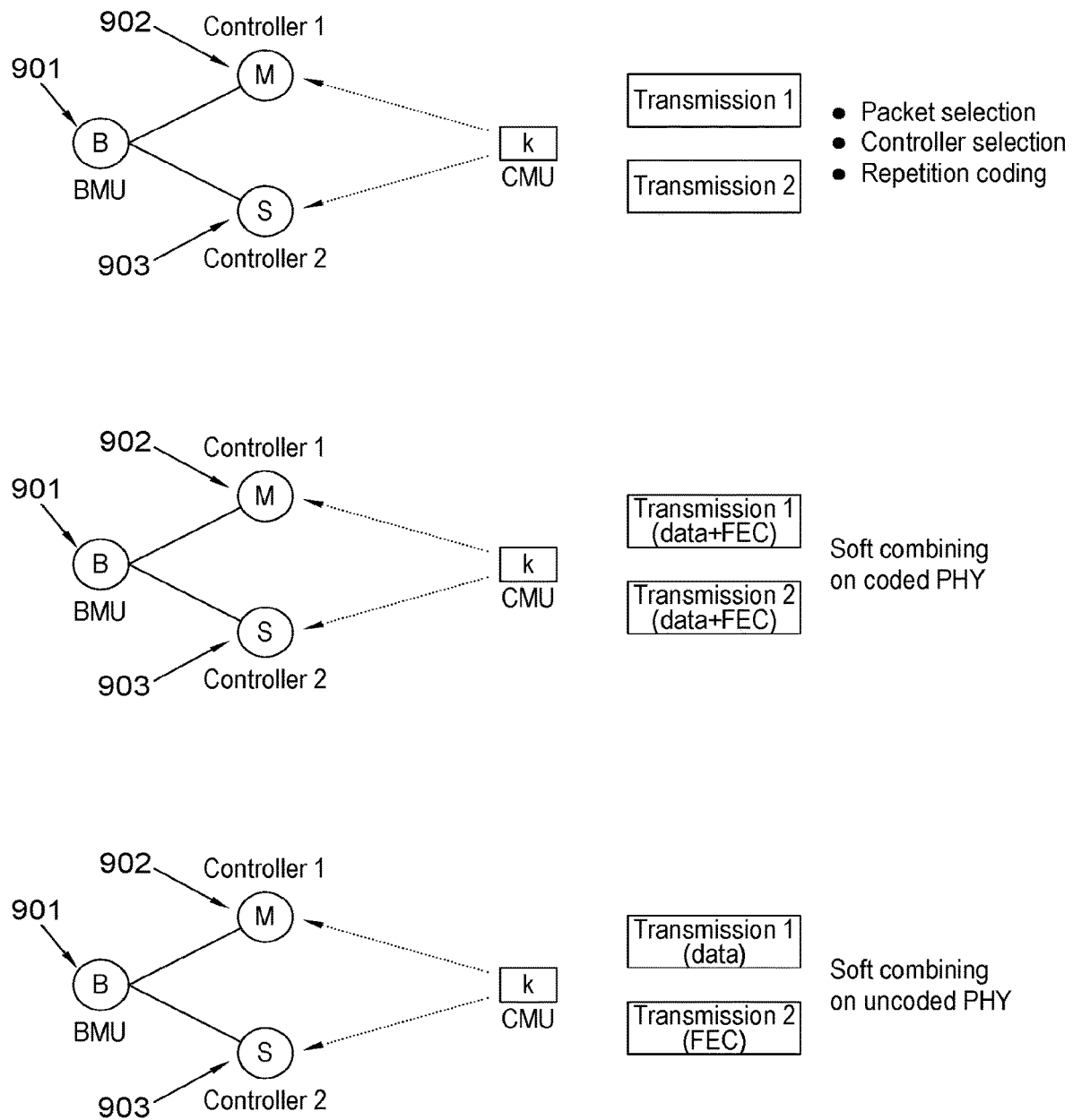
FIG. 11 shows the contents of the communications with each controller in a schedule generated using parallel operation for a plurality of multi-parent nodes.

FIG. 11 shows the contents of the communications with each controller in a schedule generated using parallel operation for a plurality of multi-parent nodes.

In an embodiment the transmissions in the uplink and the downlink are duplicated. As a result the central node 901 potentially receives two copies of the same message from each node, and each node potentially receives two copies of the same message from the central node 901. In this case each copy of the transmissions is received via a different controller node.

For uplink communications the central node 901 only retains the strongest copy (received via either of the controller nodes) of a node's uplink communications. Optionally the strongest copy is the message that has the maximum received signal strength. Similarly in the downlink the nodes (not shown) potentially receive two copies of the same downlink communications from the central node 901 and retains the strongest copy. This technique leads to high reliability for both downlink and uplink communications.

In another embodiment the central node 901 selects a controller from the plurality of controllers (e.g. the first controller 902 or the second controller 903) for receiving uplink communication from. The selection operation is performed periodically for example after a predetermined number of transmission cycles. Here a transmission cycle is the time taken to complete all uplink and downlink communications between a controller and its associated child nodes.

Alternatively a central node can select the controller from which it will receive uplink transmissions in an adaptive manner. For adaptive selection the central node 901 initially receives uplink transmissions from both controllers (i.e. the first controller 902 and the second controller 903). The central node 901 maintains an average of the received signal power. Optionally the average is based over a window of uplink transmissions for both controllers. The central node 901 then selects a controller, based on the received signal strength, after a certain number of communication cycles. This is approach is advantageous since it leads to reduced signalling.

Additionally, or alternatively, the central node 901 selects a controller from the plurality of controllers that it will use for transmitting downlink information. In this case the central node 901 requests downlink received signal strength information, measured by the nodes (not shown) for transmissions from the first controller 902 and the second controller 903. The downlink signal strength information measured by the nodes is included in the uplink communications from the nodes. Based on the reported signal strength in the messages transmitted by the nodes, the central node 901 selects a controller from the plurality of controllers for downlink transmissions.

In another embodiment the uplink and downlink transmissions are based on a coded Physical (PHY) layer such as the 125/500 kbps coded PHY layers used in Bluetooth 5. In the uplink direction a node transmits data coupled with channel coding information on both networks using the allocated timeslots. The central node 901 receives both transmissions. If a transmission relayed via a controller node is corrupted the central node 901 does not discard it, but instead uses the second transmission over the other network and the retransmission over the first network to determine, based on majority logic, the contents of the transmission. This process can also be used by each node to determine the contents of the downlink transmissions.

In another embodiment the transmission are based on a coded Physical (PHY) layer. In this embodiment the central node 901 receives a copy of a node's transmissions via each of the controllers. The transmissions comprise data and forward error correction. In order to determine the contents of the transmissions the central node 901 performs maximum ratio combining by taking into account the gain of the uplink channel from the relevant controller to central node 901. This technique is high reliability and can be used in the downlink where nodes (not shown) perform maximum ratio combining by taking into account the gain of the downlink channels.

In another embodiment the uplink and downlink transmissions are based on an un-coded Physical (PHY) layer. In this embodiment the first network (formed with the first controller 902) is used for transmissions comprising data from each of the nodes whereas the second network (formed with the second controller 903) is used for transmissions comprising error correction information from each of the nodes. This approach is advantageous as it allows the central node 901 to recover a corrupted transmission based on the error correction information received from a different path. Similarly, this approach can also be used for downlink communications.

In the sections above we have discussed techniques for generating an uplink and downlink communication schedule based on knowledge of the topology (e.g. by knowing which nodes are children of a particular parent node). In the following description techniques for topology generation are proposed which are simple, pragmatic and require little overhead. These techniques for topology generation can be realised at layer 2 of layer 3 of the OSI protocol stack.

Figure 12:
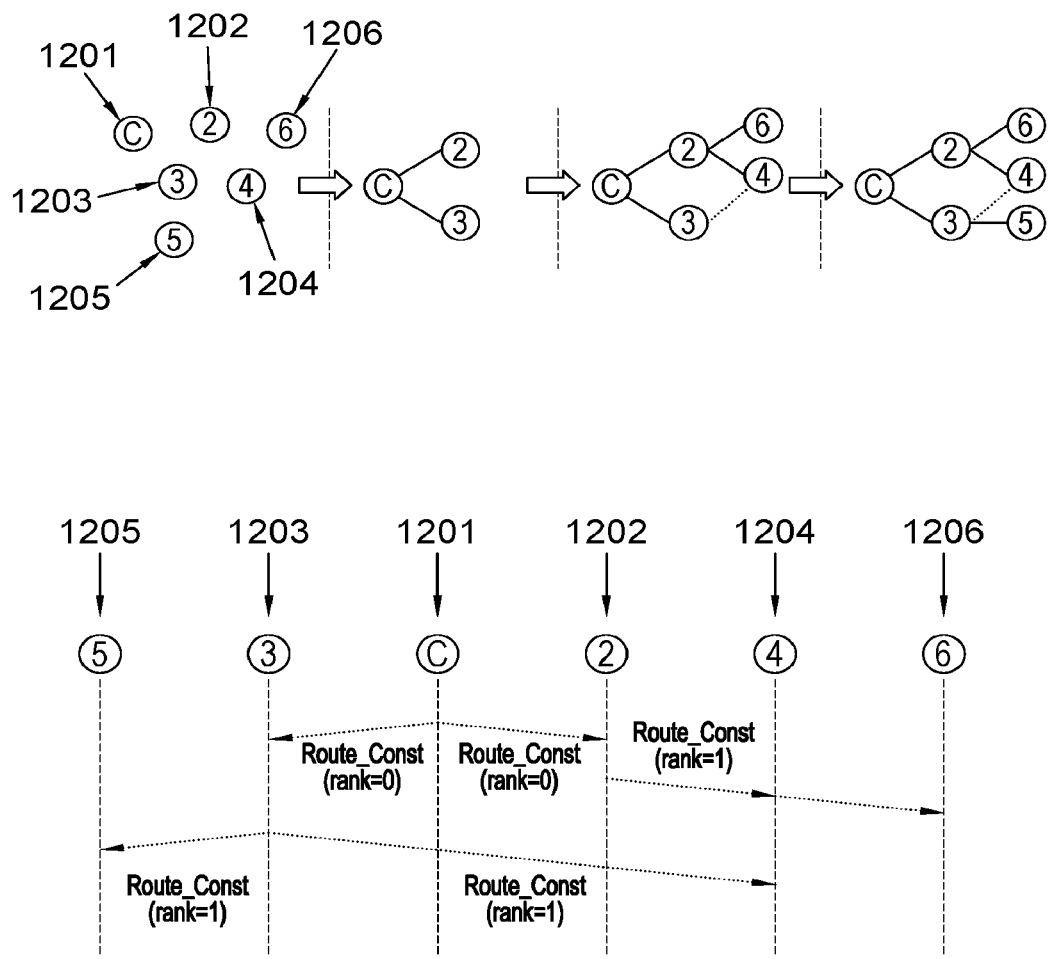
FIG. 12 shows the generation of a network topology using network layer signalling.

FIG. 12 shows the generation of a network topology using network layer signalling. FIG. 12 shows a network comprising a controller node 1201, a second node 1202, a third node 1203, a fourth node 1204, a fifth node 1205 and a sixth node 1206.

In order to generate a network topology the controller node 1201 broadcasts a route construction (Route_const) message with a specific rank metric. In one embodiment the distance from the controller (in a number of hops) is the rank metric. As a result, the rank metric in the route construction message transmitted by the controller node 1201 is 0.

Since the second node 1202 and the third node 1203 are within communicative range of the controller node 1201, they will receive the Route_const message transmitted by the controller node 1201 and will compute their own ranks by incrementing the received rank by 1, indicating that the node is 1 hop in the network from the transmitter of the recently received Route_const message.

The second node 1202 and the third node 1203 subsequently each transmit Route_const messages with a rank metric of 1 and specifying the controller node 1201 as their default parent node. The controller node 1201 receives the Route_const messages from the second node 1202 and the third node 1203. Since the rank metric in the received message is incremented by one with respect to the controller node 1201, the controller node 1201 lists the second node 1202 and the third node 1203 as its child nodes.

The fourth node 1204 and the sixth node 1206 both receive Route_const messages from the second node 1202 and increment the received rank metric by one before broadcasting their own Route_const message containing the incremented rank metric. The second node 1202 lists the fourth node 1204 and the sixth node 1206 as it's children since it receives a Route_const message from each of these nodes containing a rank metric corresponding to the second node's 1202 rank metric incremented by one.

A similar process is followed by the fifth node 1205 which receives a Route_const message broadcast by the third node 1203. In the network topology of FIG. 12 the fourth node 1204 is positioned such that it receives two Route_const messages and therefore has an opportunity for multi-parent association.

Where a node receives a Route_const from a plurality of different nodes all with the same rank index, the node will form a primary parent connection, otherwise known as the default parent, with the transmitter of the first received Route_const message and will form a secondary parent connection with the other nodes of the same rank index.

In this case the fourth node 1204 transmits two Route_const messages. As discussed above, the first message was generated in response to the second node 1202 transmitting a Route_const message with rank index 1. The second message is generated in response to the third node transmitting a Route_const message with rank index 1. Since the fourth node 1204 has already formed a primary parent connection it will indicate in the second message that this message is for forming a secondary association. Optionally, this is conveyed in a 1-bit field in the Route_const message. In this way the fourth node 1204 is able to form a multi-parent association with its surrounding nodes (i.e. the second node 1202 and the third node 1203).

In an embodiment the above described process continues for a fixed duration which is dependent on the size of the network.

Topology generation in layer 2 (i.e. the data link layer) can also be specifically adapted for networks, such as a Wireless Battery Arena Network (WiBaAN), where the number of nodes is known at the central node (e.g. the Battery Management Unit).

Figure 13:
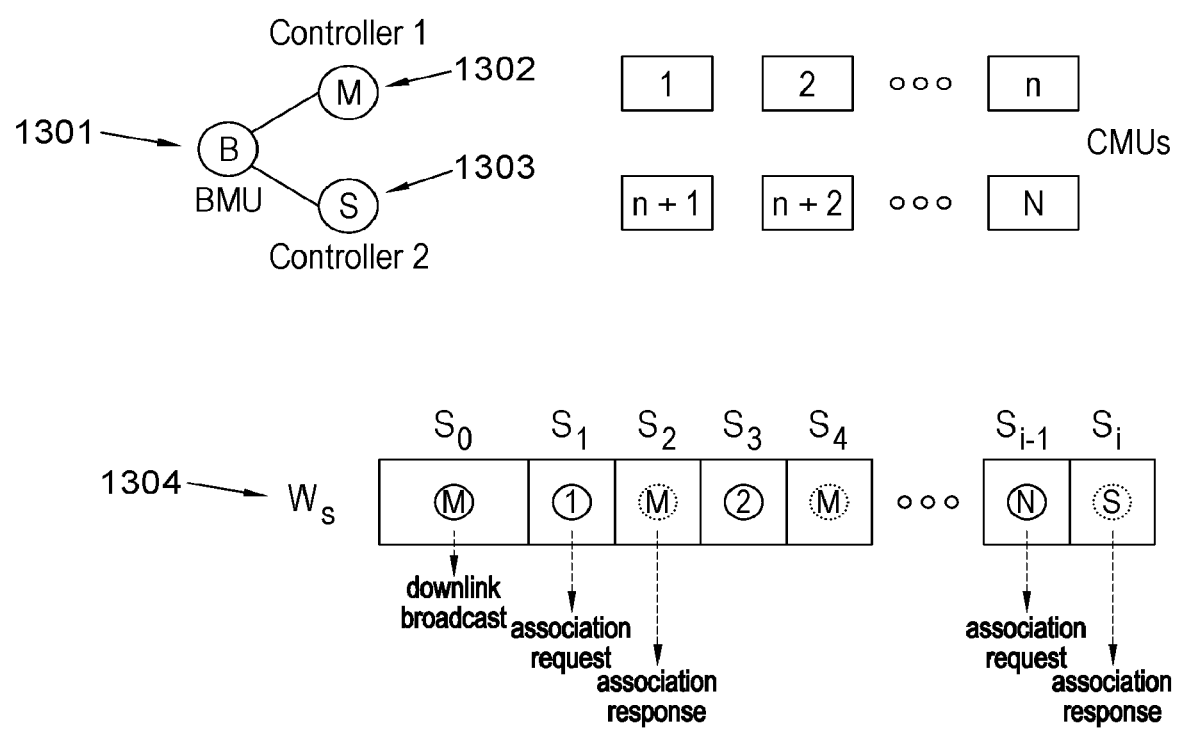
FIG. 13 shows the generation of a single-hop topology using layer 2 signalling according to an embodiment.

FIG. 13 shows the generation of a single-hop topology using layer 2 signalling according to an embodiment. FIG. 13 shows a network comprising a central node 1301, a master controller 1302 and a slave controller 1303. In FIG. 13 the master controller 1302 and the slave controller 1303 are in range of each other. The topology shown in FIG. 13 also comprises N nodes (not shown) that are in range of the central node 1301.

The plurality of N nodes (e.g. CMUs) are logically split across two controllers. FIG. 13 shows nodes 1 to n being associated with the master controller 1302 and nodes n+1 to N being associated with the slave controller 1303. In this embodiment the topology is generated based on scheduled communication on a signalling channel 1304.

Initially the central node 1301 broadcasts schedule information. In the signalling schedule each node from the N nodes is allocated two timeslots. The first timeslot is for transmitting, from the relevant node, an association request message. The second timeslot is for receiving, from the associated controller node, an association response.

Since the number of nodes in the topology (N) is known a priori, it is possible to split the N nodes (not shown) across two controllers (i.e. the master controller 1302 and the slave controller 1303) for the sake of primary-secondary parent/child association. In this example each node is allocated an ID so it is possible to split the plurality of nodes into two logical groups. Accordingly nodes 1 to n receive an association response from the master controller 1302 and nodes n+1 to N receive an association request from the slave controller 1303.

In this case no layer 3 signalling is required to form a single-hop network topology.

Figure 14:
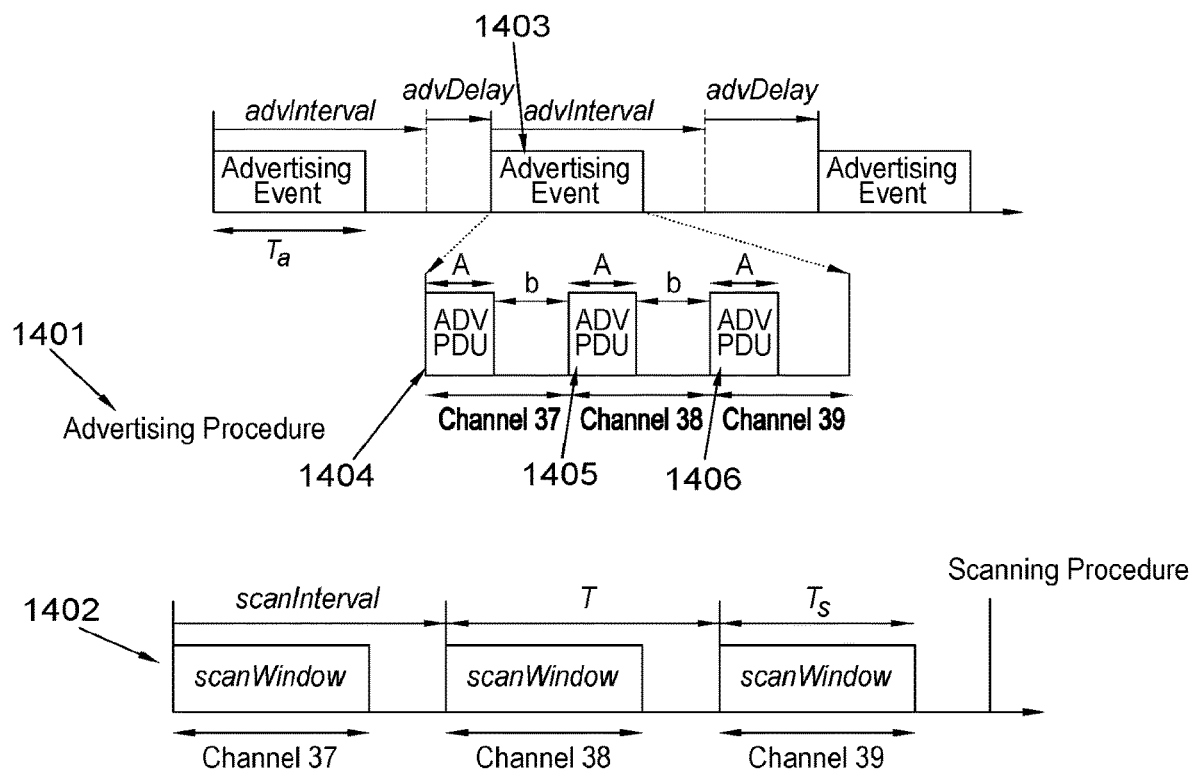
FIG. 14 shows an advertising procedure for generating a topology using layer 2 signalling via managed flooding according to an embodiment.

FIG. 14 shows an advertising procedure for generating a topology using layer 2 signalling via managed flooding according to an embodiment. FIG. 14 shows an advertising procedure 1401 where a controller node broadcasts data over a fixed number of frequency channels and a scanning procedure 1402 where a receiver node periodically scans these channels for signalling messages. The advertising procedure 1401 comprises periodically transmitting advertising events. An advertising event 1403 comprises multiple transmissions, one on each frequency channel. Each transmission comprises a route construction message (Route_const) for generating a network topology as discussed above.

For example, the advertising event 1403 comprises a first transmission 1404 on a first frequency channel (i.e. Channel 37), a second transmission 1405 on a second frequency channel (i.e. Channel 38) and a third transmission 1406 on a third frequency channel (i.e. Channel 39). The same route construction message (Route_const) is advertised over each frequency channel and optionally over a plurality of advertising events. Accordingly, as part of the scanning procedure a controller periodically scans the plurality of frequency channels (i.e. the first, second and third frequency channel) to receive advertising messages from other nodes and thereby confirm that a parent/child association in the topology has been formed.

Figure 15:
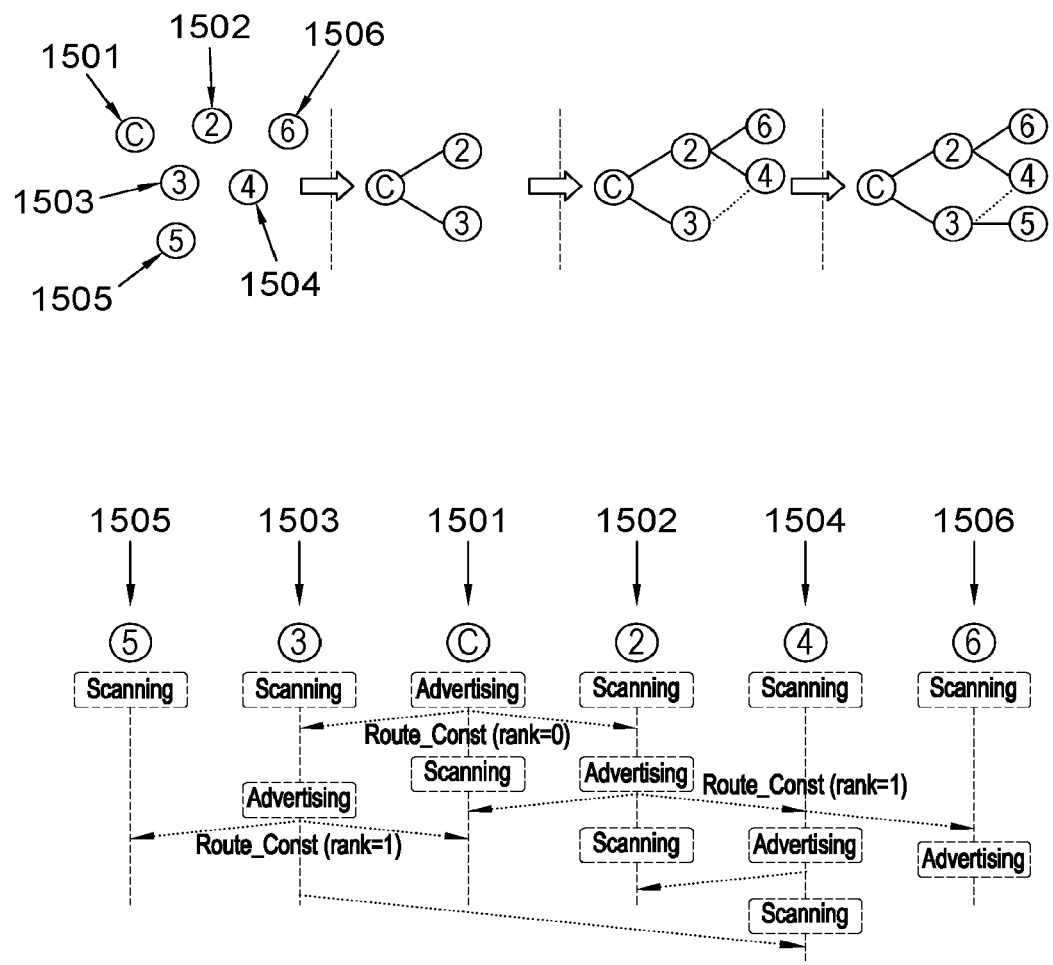
FIG. 15 shows the generation of a topology using the advertising and scanning process shown in FIG. 14.

FIG. 15 shows the generation of a topology using the advertising and scanning process shown in FIG. 14. FIG. 15 shows a network comprising a controller node 1501, a second node 1502, a third node 1503, a fourth node 1504, a fifth node 1505 and a sixth node 1506. To generate a network topology the controller node 1501 broadcasts a route construction (Route_const) message with a rank metric of 0 during an advertising event, optionally over a plurality of advertising events. The second node 1502 and the third node 1503 are within radio range of the controller node 1501 and will therefore receive the advertised message from the controller node 1501.

After advertising the route construction (Route_const) message the controller node 1501 switches to scanning mode and listens for advertised messages from neighbouring nodes. The second node 1502, in scanning mode, receives the route construction (Route_const) message transmitted by the controller node 1501. The second node 1502 subsequently computes its own rank (by incrementing the received rank value by 1) and switches to advertising mode.

The second node 1502 will list the controller node 1501 as its parent node since the controller node 1501 is the lowest rank node from which the second node 1502 has received a route construction (Route_const) message. The second node 1502 lists the controller node 1501 as its default parent. The second node 1502 "piggy backs" this information in the route construction (Route_const) message which it subsequently transmits. In this way, the controller node 1501, which is now in scanning mode, is able to identify child nodes.

After transmitting the route construction (Route_const) message in advertising mode, the second node 1502 switches to scanning mode. A similar procedure of listening for route construction (Route_const) messages in scanning mode, switching to advertising mode to transmit a node's own route construction (Route_const) message before reverting to scanning mode in order to receive further route construction (Route_const) messages is followed by each of the other nodes in the network.

In the example topology of FIG. 15 the fourth node 1504 receives two route construction (Route_const) messages. A first route construction message from the second node 1502 and a second route construction message from a third node 1503. Since the rank contained within both of these messages is the same the fourth node 1504 has an opportunity for multi-parent association.

This advertising and scanning procedure continues for a fixed duration which depends on the size of the network.

The techniques discussed above for generating a communication schedule and a topology for a multi-hop communications are designed to achieve high-performance wireless connectivity in a Wireless Batter Area Network (WiBaAN). In addition to achieving high reliability, the techniques discussed herein also have a low latency and a high energy efficiency.

Further advantages also include; the disclosed technique can be realised on any off-the-shelf low power wireless chipset (e.g. Bluetooth) without any hardware modifications. Additionally, the disclosed technique can ensure self-organization of a WiBaAN and provides a lean network layer functionality for wireless control networks.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of generating a communication schedule for a plurality of nodes in a multi-hop network, the nodes comprising at least a first node, a second node and a third node, wherein the second node is a primary parent of the first node and the third node is a secondary parent of the first node, the method comprising:
   requesting, by the first node,
      a first resource in the communication schedule for communication from the first node to the second node, and
      a second resource in the communication schedule for communication from the first node to the third node;
   allocating, by at least one of the second node or the third node, a first set of resources in the communication schedule comprising:
      a third resource in the communication schedule for communication from the first node to the second node; and
      a fourth resource in the communication schedule for communication from the first node to the third node, wherein:
         at least the third resource does not generate a conflict in the communication schedule,
   determining, by at least one of the second node or the third node, whether the first resource or the second resource generates a conflict in the communication schedule;
   and if the first resource or the second resource does not generate a conflict in the communication schedule,
      assigning the third resource equal to the first resource, and
      assigning the fourth resource equal to the second resource, wherein a resource is a timeslot on a frequency channel; and
   requesting by the third node, a plurality of resources in the communication schedule comprising:
      a fifth resource for transmitting data generated by the third node;
      a resource for a fourth node that associates the third node as a primary parent node;
      a resource for a fifth node that associates the third node as a secondary parent node; and
      at least one resource for transmitting a combined message, wherein the combined message is formed by combining data received from the fourth node that associates the third node as a primary parent and data received from the fifth node that associates the third node as a secondary parent.

2. A method according to claim 1 further comprising:
   receiving, by the first node, a downlink signalling message (DLS) comprising a relative transmission priority for the first node or a sixth node that uses the second node as a primary parent; and
   requesting, by the first node, the first resource and the second resource on a scheduling channel based on the relative transmission priority of the first node in the downlink signalling message (DLS).

3. A method according to claim 2, wherein the downlink signalling message (DLS) further comprises a relative transmission priority for a seventh node that uses the second node as a secondary parent.

4. A method according to claim 1 wherein:
   the first node requests the first resource and the second resource by transmitting a multi-packet request for uplink slots message (MP-RFS-U), and
   the first set of resources is allocated by the second node.

5. A method according to claim 4, wherein the third node is a primary parent of a sixth node and the method further comprises:
   receiving, by the third node, from the sixth node, after receiving the request from the first node, a request for a sixth resource in the communication schedule; and
   transmitting, by the third node a multi-packet assignment message (MP-ASG) comprising:

an indication of whether the second resource or the sixth resource generates a conflict in the communication schedule.

6. A method according to claim 1, wherein the first set of resources is allocated by the second node and the third node, and the method further comprises:
   requesting, by the first node, the first resource by transmitting a first Request-for-Slots (RFS) message to the second node: and
   requesting, by the first node, the second resource by transmitting a second Request-for-Slots (RFS) message to the third node.

7. A method according to claim 1 wherein a sixth node acts as the primary parent to the third node, and the method further comprises:
   requesting, by the third node, a plurality of resources in the communication schedule comprising:
      a sixth resource for transmitting data generated by the third node; and
      a number of resources equal to a number of nodes that associate the third node as a parent node.

8. A method according to claim 1 further comprising:
   determining, by the first node, whether an assignment message (ASG) has been received after requesting at least one of the first resource or the second resource; and if the assignment message has not been received after requesting at least one of the first resource or the second resource:
   requesting at least a sixth resource in the communication schedule, wherein the sixth resource is on a different frequency channel than the first resource or the second resource.

* * * * *